(12) United States Patent
Yamazaki et al.

(10) Patent No.: US 6,263,162 B1
(45) Date of Patent: Jul. 17, 2001

(54) IMAGE-SHAKE PREVENTING APPARATUS

(75) Inventors: Tatsuya Yamazaki, Machida; Yoshikazu Ishikawa, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/378,056

(22) Filed: Aug. 20, 1999

(30) Foreign Application Priority Data

Aug. 25, 1998 (JP) .................................................. 10-253332
Aug. 25, 1998 (JP) .................................................. 10-253333

(51) Int. Cl.$^7$ .................................................. G03B 17/00
(52) U.S. Cl. .................................................. 396/55
(58) Field of Search .................. 396/52, 55; 348/208; 359/554, 555, 556, 557

(56) References Cited

U.S. PATENT DOCUMENTS 4,965,619 * 10/1990 Shikaumi et al. ...................... 396/55
6,091,448 * 7/2000 Washisu et al. ...................... 348/208

* cited by examiner

*Primary Examiner*—W. B. Perkey
(74) *Attorney, Agent, or Firm*—Robin, Blecker & Daley

(57) ABSTRACT

In an apparatus such as an image-shake preventing apparatus and a control method therefor, an image-shake preventing unit is caused to gradually come into contact with a movable-range end when an image-shake preventing operation is ended.

46 Claims, 20 Drawing Sheets

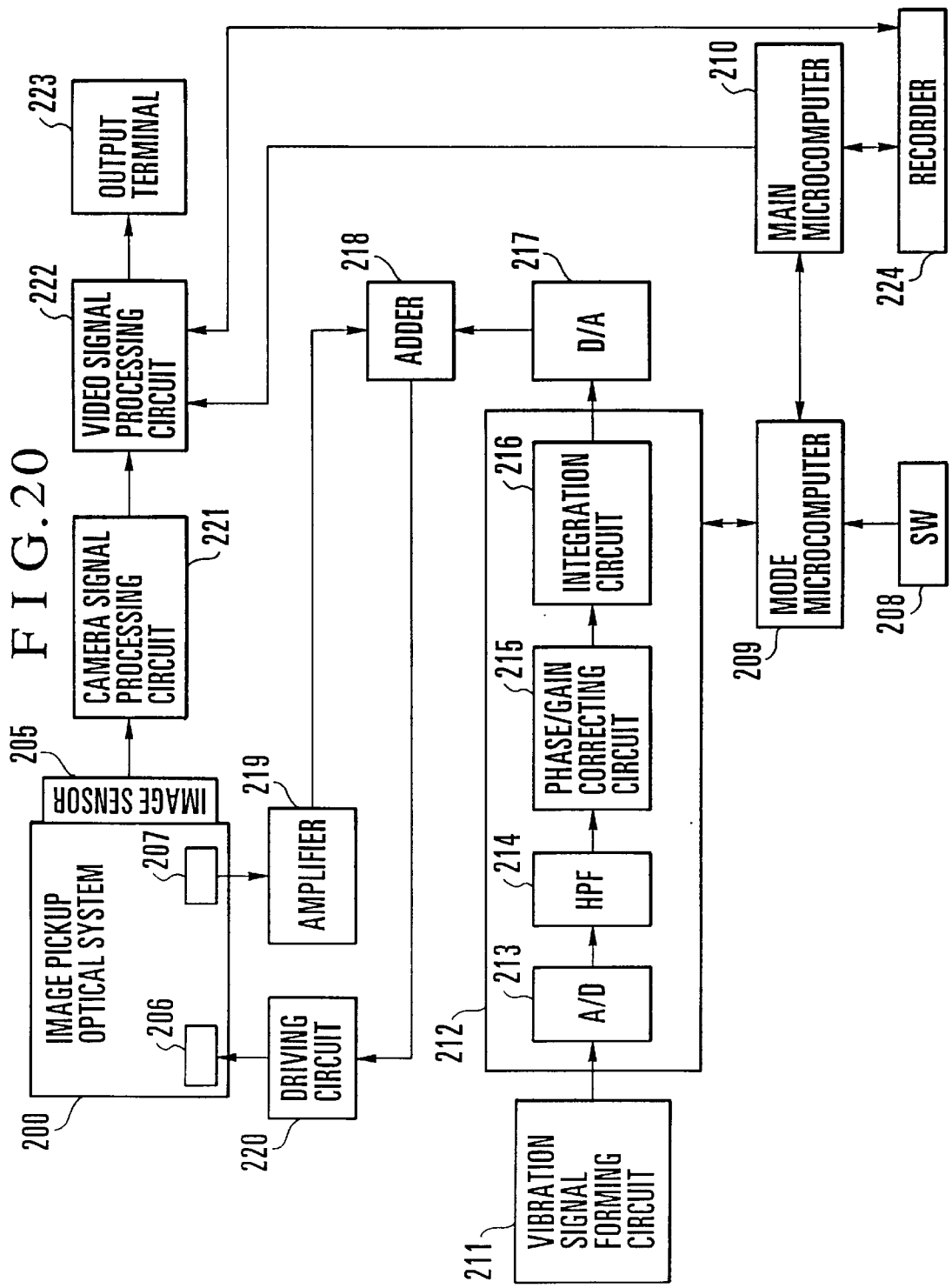

IMAGE-SHAKE PREVENTING APPARATUS

BACKGROUND OF THE INVENTION

1. Field of the Invention

The present invention relates to an apparatus such as an image-shake preventing apparatus for preventing the shake of an image, and to a control method therefor.

2. Description of Related Art

It is known that, in an image pickup apparatus such as a small-sized video camera, a picked-up object image shakes due to the vibration of the image pickup apparatus, so that a video image intolerable to view might be outputted or recorded.

In particular, in such a kind of image pickup apparatus, it has become general these days that a zoom lens capable of continuously varying the focal length without changing the image point position is mounted in the image pickup apparatus, and, in recent years, an image pickup apparatus having a high zoom magnification ratio of ten or more times has widely come into the market. However, such an image pickup apparatus has a drawback that, when an object image is picked up with the setting of the telephoto side, which is set for the larger zoom magnification, a conspicuous shaking of the object image would occur.

Therefore, as measures to solve the above drawback, an image pickup apparatus having mounted therein an image pickup optical system having image-shake correcting means has been developed so far and has already been put on the market.

FIG. 18 is a conceptual diagram schematically showing the above-mentioned image pickup optical system, which is denoted by reference numeral 200. In the image pickup optical system 200, there are disposed, in order, a fixed lens 201 securely fixed to a lens barrel (not shown), a variator lens 202 arranged to move in the horizontal direction on an optical axis "c" as indicated by an arrow "a", a shift lens 203 arranged to move two-dimensionally within a plane perpendicular to the optical axis "c" (in the direction indicated by an arrow "b", a focusing lens 204 having the focus adjusting function and the function of correcting the movement of a focal plane resulting from the movement of the variator lens 202, and an image sensor 205 on which to form an object image. Further, in the respective predetermined positions adjacent to the shift lens 203, there are disposed an actuator 206 arranged to drive the shift lens 203 and a position detecting sensor 207 arranged to detect the position of the shift lens 203.

In the image pickup apparatus 200, even if, as shown in FIG. 19(a), the optical axis "c" deviates from a central axis "c'" of the image pickup optical system 200 due to the vibration thereof as much as a deviation angle e, it is possible to make the optical axis "c" and the central axis "c'" of the image pickup optical system 200 geometrically coincident with each other on the downstream side of the shift lens 203, by driving the actuator 206 to move the shift lens 203 as indicated by an imaginary line in FIG. 19(b). Accordingly, the above-mentioned deviation angle θ is corrected by an optical processing, so that the object image is formed on the image sensor 205 as a light flux having no shaking.

FIG. 20 is a block diagram showing the arrangement of a conventional image pickup apparatus which corrects an image shake by means of the image pickup optical system 200.

In the image pickup optical system shown in FIG. 20, when a power supply switch 208 is turned on, a mode microcomputer 209 notifies a main microcomputer 210 of the turning-on of the power supply switch 208. Then, having determined that the power supply has been turned on, the main microcomputer 210 starts its control operation.

Subsequently, a vibration signal forming circuit 211, which has detected the vibration of the body of the image pickup apparatus, forms a vibration signal and supplies the vibration signal to a vibration correcting circuit 212. In the vibration correcting circuit 212, the analog vibration signal is converted into a digital vibration signal by an A/D converter 213, and, then, a predetermined low-frequency component is removed from the digital vibration signal by a high-pass filter (HPF) 214. After that, the phase and gain of an output signal of the HPF 214 are corrected by a phase/gain correcting circuit and an output signal of the phase/gain correcting circuit 215 is integrated by an integration circuit 216 to calculate and output a correction target value.

The correction target value outputted from the vibration correcting circuit 212 is converted into an analog value by a D/A converter 217 and is then supplied to an adder 218. At the adder 218, the analog correction target value is added to a feedback signal supplied from the position detecting sensor 207 through an amplifier 219. Then, an output signal of the adder 218 is supplied to a driving circuit 220. The driving circuit 220 issues a driving signal to the actuator 206 to drive the shift lens 203.

When the shift lens 203 is driven by the actuator 206, as described above, the deviation angle e is optically corrected, so that the object image is formed on the image sensor 205 as a light flux having no shaking.

Further, an electric signal obtained through the photo-electric conversion by the image sensor 205 is supplied to a video signal processing circuit 222 via a camera signal processing circuit 221. Then, a video signal produced by the video signal processing circuit 222 is outputted to an output terminal 223 so as to be converted into a visible video image on the display screen, and, at the same time, is recorded, as video information in the form of an RF signal, on a recording medium such as a magnetic tape by a recorder 224.

Incidentally in the above-mentioned image pickup apparatus, the actuator 206 for driving the shift lens 203 is composed of a voice coil motor.

More specifically, the voice coil motor is disposed in a predetermined position adjacent to the shift lens 203. By causing current to flow to the voice coil motor to generate an electromagnetic force, the shift lens 203 is made to float, and by varying the electromagnetic force according to an output of the adder 218, the shift lens 203 is made to two-dimensionally move within a plane perpendicular to the optical axis "c" in the vertical direction (in the pitching direction) and in the horizontal direction (in the yawing direction).

However, since, in the conventional image pickup apparatus, as described above, the actuator 206 is composed of a voice coil motor, the shift lens 203 is held in a floating state by the voice coil motor when the voice coil motor is a conductive state with the power supply switch 208 turned on, but, when the power supply is turned off, the holding force for the shift lens 203 by the voice coil motor is canceled, so that the shift lens 203 drops due to its own weight. As a result, a lens holding frame which holds the shift lens 203 collides with an inner wall of the lens barrel to generate a collision sound, which is offensive to the ear.

Further, since the optical axis "c" decenters due to the movement of the shift lens 203, for example, if the power supply is turned off during the process of an image pickup operation of the image pickup apparatus, there is a possibility that a video image having an unnatural motion is outputted or recorded on the recording medium.

BRIEF SUMMARY OF THE INVENTION

In accordance with one aspect of the invention, there are provided an apparatus such as an image-shake preventing apparatus and a control method therefor, in which an image-shake preventing unit is caused to gradually come into contact with a movable-range end when an image-shake preventing operation is ended, so that it is possible to prevent the image-shake preventing unit from colliding with the movable-range end to generate a collision sound when the image-shake preventing operation is ended.

In accordance with another aspect of the invention, there are provided an apparatus such as an image-shake preventing apparatus and a control method therefor, in which an image-shake preventing unit is caused to come into contact with a movable-range end when an image-shake preventing operation is ended, and an operation for causing the image-shake preventing unit to come into contact with the movable-range end is started after completion of counting of a predetermined period of time after an instruction for ending the image-shake preventing operation is issued, so that it is possible to prevent an unnatural video image from being outputted or being recorded due to the contact of the image-shake preventing unit with the movable-range end at the time of the end of the image-shake preventing operation.

In accordance with another aspect of the invention, there are provided an apparatus such as an image-shake preventing apparatus and a control method therefor, in which an image-shake preventing unit is caused to come into contact with a movable-range end when an image-shake preventing operation is ended, and an operation for causing the image-shake preventing unit to come into contact with the movable-range end is inhibited from starting, until an image pickup apparatus ends an image pickup operation, even if an instruction for ending the image-shake preventing operation is issued, so that it is possible to prevent an unnatural video image from being outputted due to the contact of the image-shake preventing unit with the movable-range end at the time of the end of the image-shake preventing operation.

In accordance with another aspect of the invention, there are provided an apparatus such as an image-shake preventing apparatus and a control method therefor, in which an image-shake preventing unit is caused to come into contact with a movable-range end when an image-shake preventing operation is ended, and an operation for causing the image-shake preventing unit to come into contact with the movable-range end is inhibited from starting, until an image recording apparatus ends an image recording operation, even if an instruction for ending the image-shake preventing operation is issued, so that it is possible to prevent an unnatural video image from being recorded due to the contact of the image-shake preventing unit with the movable-range end at the time of the end of the image-shake preventing operation.

The above and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 20 is a block diagram showing the arrangement of a conventional control system in the image pickup apparatus.

DETAILED DESCRIPTION OF THE INVENTION

Hereinafter, preferred embodiments of the invention will be described in detail with reference to the drawings.

Figure 1:
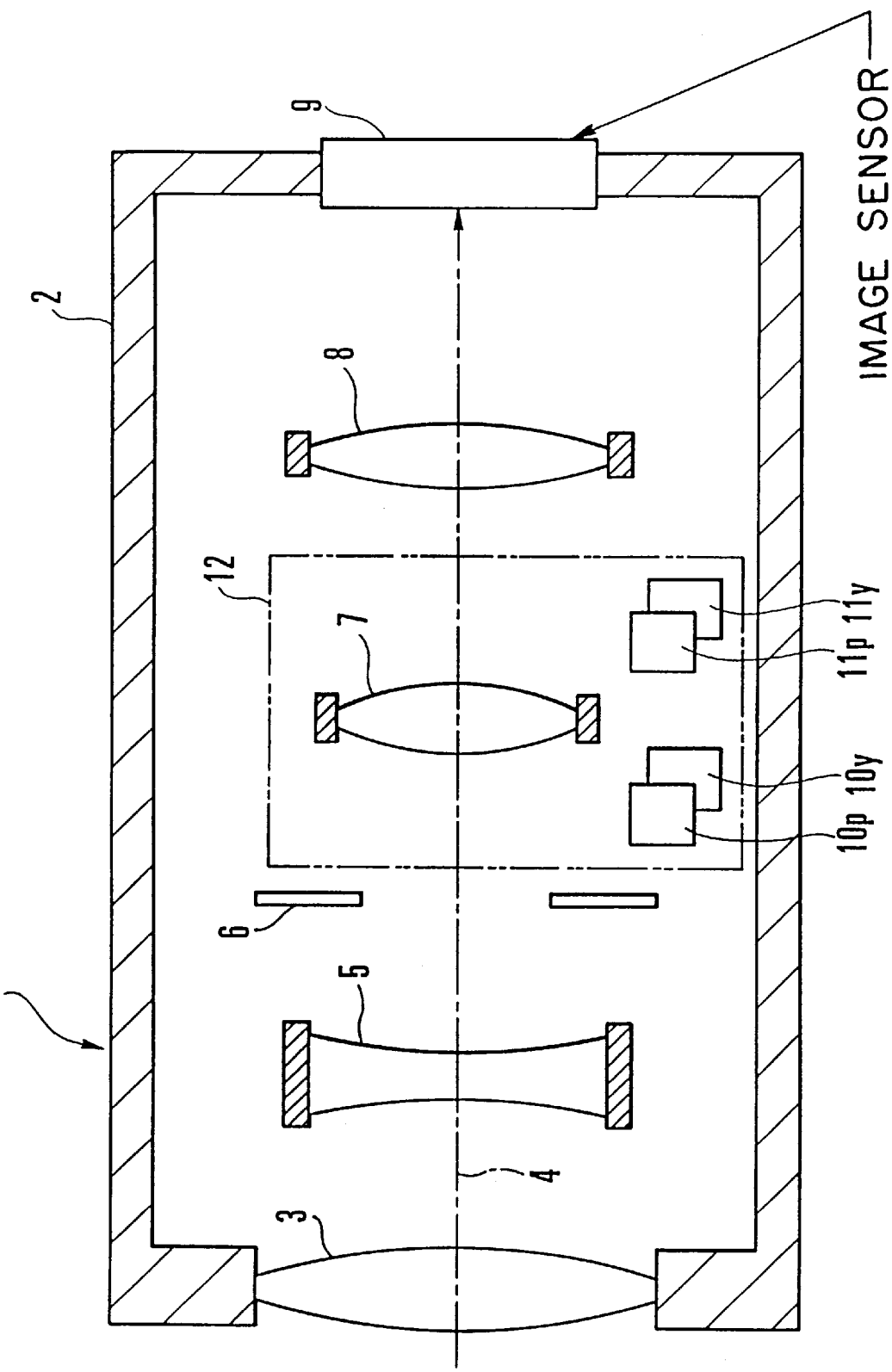
FIG. 1 is a schematic diagram showing the arrangement of an image pickup optical system mounted on an image pickup apparatus according to each embodiment of the invention.

FIG. 1 is a schematic diagram showing the arrangement of an image pickup optical system mounted on an image pickup apparatus according to each embodiment of the invention. The image pickup optical system, which is denoted by reference numeral 1, is provided with a fixed lens 3 securely fixed to a lens barrel 2 and arranged to have a light signal from an object incident thereon, a variator lens 5 arranged to move in the horizontal direction along an optical axis 4 so as to vary the magnification of an object image, an iris 6 arranged to adjust the amount of incident light, a shift lens 7 arranged to two-dimensionally move in the vertical direction (hereinafter referred to also as the pitching direction) and in the horizontal direction (hereinafter referred to also as the yawing direction) within a plane vertical to the optical axis 4, a focusing lens 8 having the focus adjusting function and the function of correcting the deviation of focus resulting from the movement of the variator lens 5, and an image sensor 9, such as a CCD, arranged to have the object image formed thereon and to convert the light signal into an electrical signal.

The image pickup optical system 1 is further provided with voice coil motors 10p and 10y serving as actuators to drive the shift lens 7 in the pitching direction and in the yawing direction, and Hall elements 11p and 11y serving as position detecting sensors to detect the positions in the pitching direction and the yawing direction of the shift lens 7.

More particularly, an image stabilizing unit 12, which includes the shift lens 7, the voice coil motors 10p and 10y and the Hall elements 11p and 11y, is disposed between the iris 6 and the focusing lens 8 so as to prevent the image shake caused by the vibration or the like of the image pickup apparatus.

Figure 2:
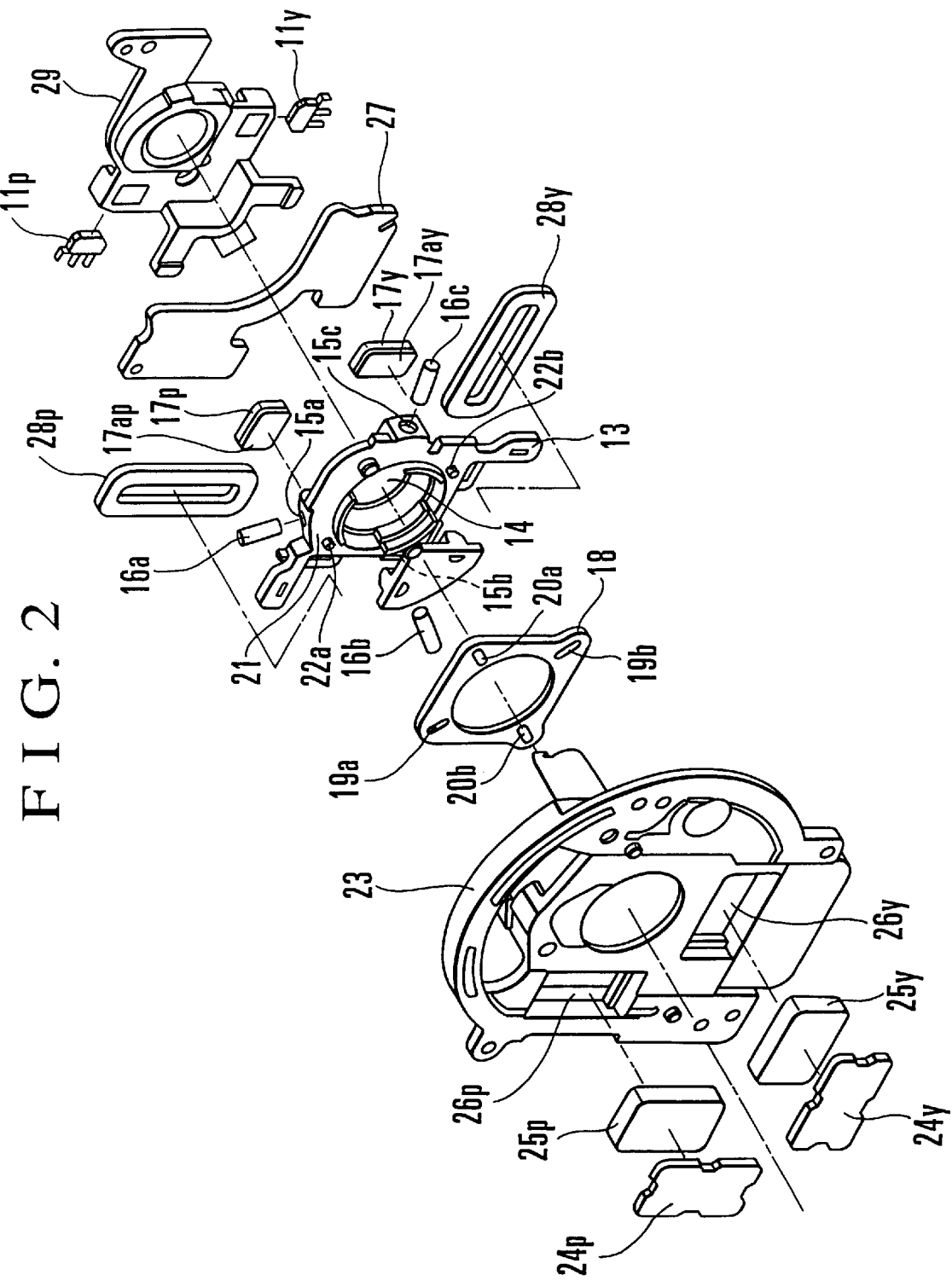
FIG. 2 is an exploded perspective view of an image stabilizing unit disposed inside the image pickup optical system.

FIG. 2 is an exploded perspective view of the image stabilizing unit 12.

In FIG. 2, reference numeral 13 denotes a lens holding frame. The shift lens 7 is held by a cylindrical part 14 of the lens holding frame 13.

Further, on the outer circumferential portion of the lens holding frame 13, there are formed three holes 15a, 15b and 15c at intervals of 120° around the optical axis 4. Guide pins 16a, 16b and 16c of approximately columnar shape are press-fitted or bonded into the holes 15a, 15b and 15c, respectively, whereby the guide pins 16a, 16b and 16c are held integrally with the lens holding frame 13.

Reference numeral 18 denotes a guide plate, which is formed into an approximately rectangular shape. Near the corners of the guide plate 18, there are formed holes 19a, 19b, 20a and 20b of the slot shape which is long in the radial direction.

Further, reference numeral 23 denotes an intermediate tube. The intermediate tube 23 is provided with a guide part (not shown), which protrudes from the surface of the intermediate tube 23 facing the lens holding frame 13 and has holes formed into the slot shape which is long in the circumferential direction.

The guide pins 16a, 16b and 16c engage with the holes formed on the guide part of the intermediate tube 23, and pins 22a and 22b which are protrusively mounted on the surface of the lens holding frame 13 facing the guide plate 18 engage with the holes 19a and 19b of the guide plate 18. Further, pins (not shown) which are protrusively mounted on the surface of the intermediate tube 23 facing the guide plate 18 engage with the holes 20a and 20b of the guide plate 18. Thus, by such an arrangement, the lens holding frame 13 is positioned in the rotating direction (rolling direction) around the optical axis 4 with respect to the intermediate tube 23, and is, therefore, made to be guided only in the pitching direction and the yawing direction.

Further, two magnets 25p and 25y having back yokes 24p and 24y securely fixed thereto are accommodated into recessed portions 26p and 26y of the intermediate tube 23 in such a way as to be located orthogonal to each other and are securely fixed to the intermediate tube 23. Further, an upper yoke 27 is fixed to the intermediate tube 23 at a predetermined interval with respect to the magnets 25p and 25y. Thus, the back yokes 24p and 24y, the magnets 25p and 25y and the upper yoke 27 constitute a magnetic circuit. Then, coils 28p and 28y are fixed to the lens holding frame 13 at a predetermined interval with respect to the magnets 25p and 25y while confronting the magnets 25p and 25y. The back yokes 24p and 24y, the magnets 25p and 25y, the upper yoke 27 and the coils 28p and 28y constitute the voice coil motors 10p and 10y (see FIG. 1). When a current is made to flow to the coils 28p and 28y, which are located orthogonal to each other, to generate an electromagnetic force, there is generated a floating force for two-dimensionally moving the shift lens 7 in the pitching direction and in the yawing direction within a plane perpendicular to the optical axis 4. Thus, a composite force of electromagnetic forces generated by the current flowing to the coils 28p and 28y acts on the lens holding frame 13, so that the shift lens 7 is driven in the pitching direction and in the yawing direction.

Further, reference numeral 29 denotes a sensor holder, on which the Hall elements 11p and 11y are mounted. The sensor holder 29 is fixed to the intermediate tube 23. In addition, magnets 17p and 17y having yokes 17ap and 17ay stuck thereto are fixed to the lens holding frame 13. The magnets 17p and 17y are magnetized to have magnetic inclination in the driving direction of the lens holding frame 13. The Hall elements 11p and 11y are disposed at a predetermined interval with respect to the magnets 17p and 17y and are arranged to detect the position of the shift lens 7 (the lens holding frame 13) on the basis of a change in magnetic flux resulting from the movement of the magnets 17p and 17y.

Figure 3:
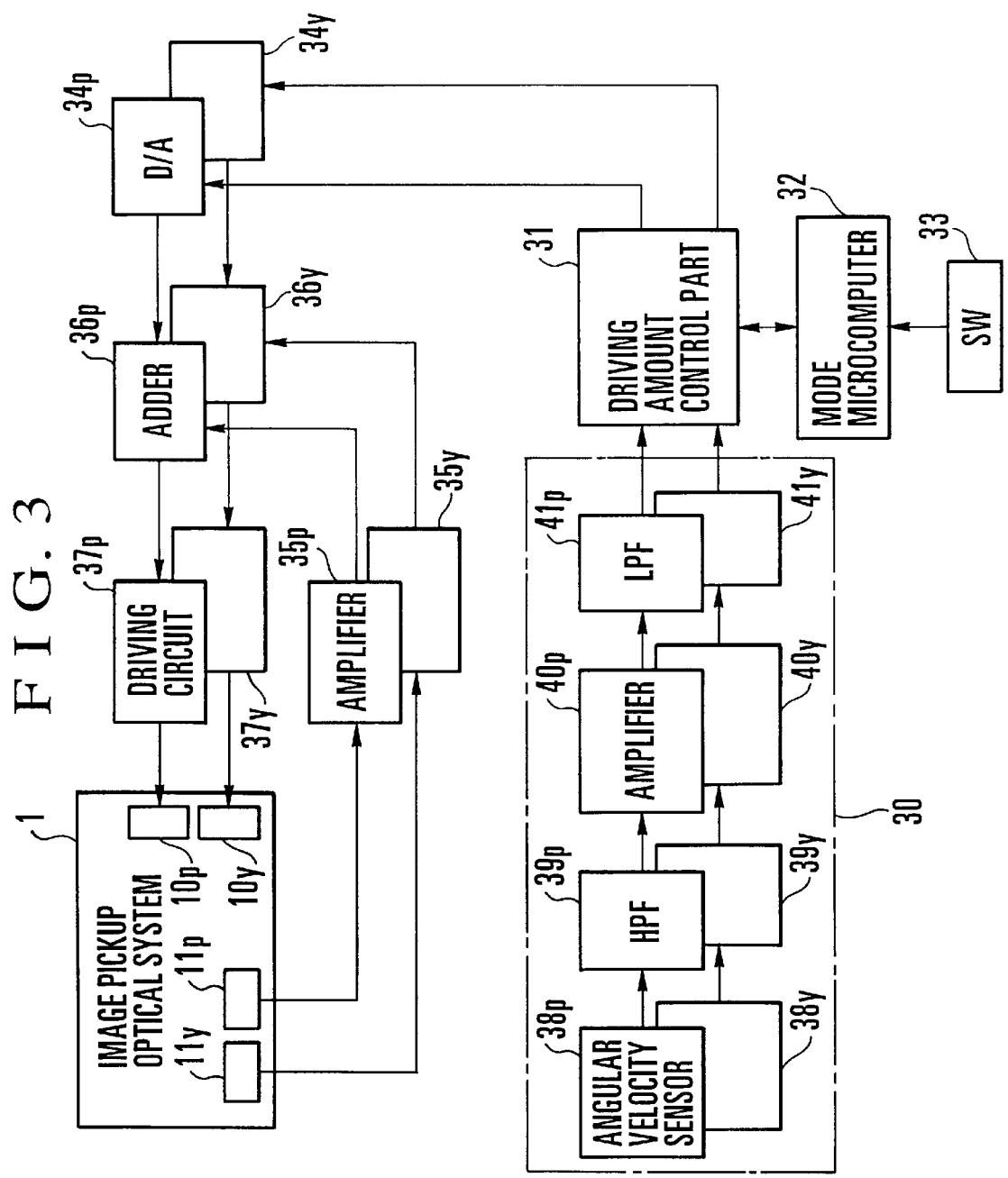
FIG. 3 is a block diagram showing the arrangement of a control system in an image pickup apparatus according to a first embodiment of the invention.

FIG. 3 is a block diagram showing the arrangement of a control system of an image pickup apparatus according to a first embodiment of the invention. Referring to FIG. 3, the image pickup apparatus is provided with the above-mentioned image pickup optical system 1, a vibration signal forming circuit 30 arranged to detect the vibration of the body of the image pickup apparatus to form vibration signals, a driving amount control part 31 arranged to control the amounts of driving of the shift lens 7 on the basis of outputs of the vibration signal forming circuit 30, etc., a mode microcomputer 32 arranged to watch the operation state of the image pickup apparatus body, a power supply switch 33 arranged to be operated to start the power supply of the image pickup apparatus body, D/A converters 34p and 34y arranged to convert the digital signals outputted from the driving amount control part 31 into analog signals, amplifiers 35p and 35y arranged to amplify the output signals of the Hall elements 11p and 11y, adders 36p and 36y arranged to add the feedback signals from the amplifiers 35p and 35y to the output signals of the D/A converters 34p and 34y, and driving circuits 37p and 37y arranged to drive the voice coil motors 10p and 10y on the basis of the output signals of the adders 36p and 36y.

The vibration signal forming circuit 30, concretely describing, includes angular velocity sensors 38p and 38y disposed at appropriate portions of the image pickup optical system 1 to detect the vibration angles of the image pickup apparatus body, high-pass filters (HPFs) 39p and 39y arranged to remove DC components from the detection signals outputted from the angular velocity sensors 38p and 38y, amplifiers 40p and 40y arranged to amplify the output signals of the HPFs 39p and 39y, and low-pass filters (LPFs) 41p and 41y arranged to remove predetermined high-frequency components from the output signals of the amplifiers 40p and 40y to form the vibration signals.

Figure 4:
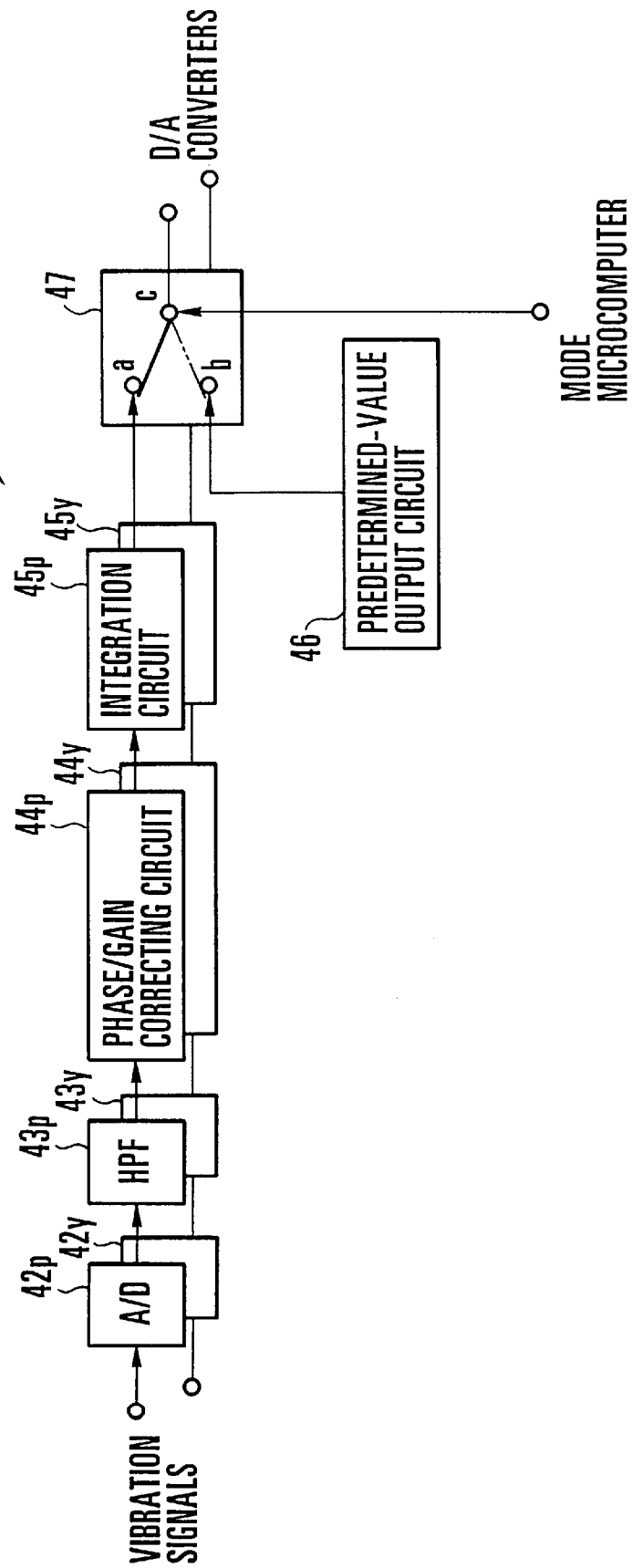
FIG. 4 is a block diagram showing the details of a driving amount control part shown in FIG. 3.

Further, the driving amount control part 31 includes, as shown in FIG. 4, A/D converters 42p and 42y arranged to convert the analog vibration signals outputted from the vibration signal forming circuit 30 into digital vibration signals, HPFs 43p and 43y arranged to remove predetermined low-frequency components from the output signals of the A/D converters 42p and 42y, phase/gain correcting circuits 44p and 44y arranged to correct the phase and/or gain of the output signals of the HPFs 43p and 43y, integration circuits 45p and 43y arranged to integrate the output signals of the phase/gain correcting circuits 44p and 44y to form correction target values for correcting the image shake, a predetermined-value output circuit 46 arranged to output a lens-movement target value (a predetermined value A) which is desired irrespective of the vibration signals from the vibration signal forming circuit 30, and a change-over switch 47 arranged to change over the output signals of the integration circuits 45p and 45y and the output signal of the predetermined-value output circuit 46. The contact "a" of the change-over switch 47 is connected to the integration circuits 45p and 45y, the contact "b" of the change-over switch 47 is connected to the predetermined-value output circuit 46, and the contact "c" of the change-over switch 47 is connected to the mode microcomputer 32. Then, the contact "c" of the change-over switch 47 is connected to the contact "a" or the contact "b" depending on the signal from the mode microcomputer 32, which watches the state of the power supply switch 33, so that the correction target values from the integration circuits 45p and 45y or the predetermined value A from the predetermined-value output circuit 46 is outputted from the change-over switch 47.

In the image pickup apparatus having the above construction, when the power supply switch 33 is turned on, the mode microcomputer 32 detects the turning-on of the power supply switch 33 and starts its control operation.

Then, when the angular velocity sensors 38p and 38y detect the vibration of the image pickup apparatus body, the HPFs 39p and 39y, the amplifiers 40p and 40y and the LPFs 41p and 41y perform predetermined processing to form vibration signals. The formed vibration signals are supplied to the driving amount control part 31. In the driving amount control part 31, correction target values are calculated via the A/D converters 42p and 42y, the HPFs 43p and 43y, the phase/gain correcting circuits 44p and 44y and the integration circuits 45p and 45y. The calculated correction target values are outputted to the D/A converters 34p and 34y via the change-over switch 47.

Subsequently, the correction target values, which have been converted into analog signals by the D/A converters 34p and 34y, are supplied to the adders 36p and 36y, where the analog correction target values are added to the feedback signals supplied from the Hall elements 11p and 11y via the amplifiers 35p and 35y. Then, the output signals of the adders 36p and 36y are supplied to the driving circuits 37p and 37y. The driving circuits 37p and 37y issue driving signals to the voice coil motors 10p and 10y to two-dimensionally drive the shift lens 7 in the vertical direction and in the horizontal direction within a plane perpendicular to the optical axis 4 during the image pickup operation on an object image.

On the other hand, when the power supply switch 33 is changed over from the on-state to the off-state, a notice of the change-over of the state of the power supply switch 33 is given to the mode microcomputer 32, and the connection of the change-over switch 47 of the driving amount control part 31 is changed over from the side of the integration circuits 45p and 45y to the side of the predetermined-value output circuit 46. Accordingly, the predetermined value A, instead of the correction target values, is outputted from the driving amount control part 31, so that the shift lens 7 is made to be driven on the basis of the predetermined value A.

Figure 5:
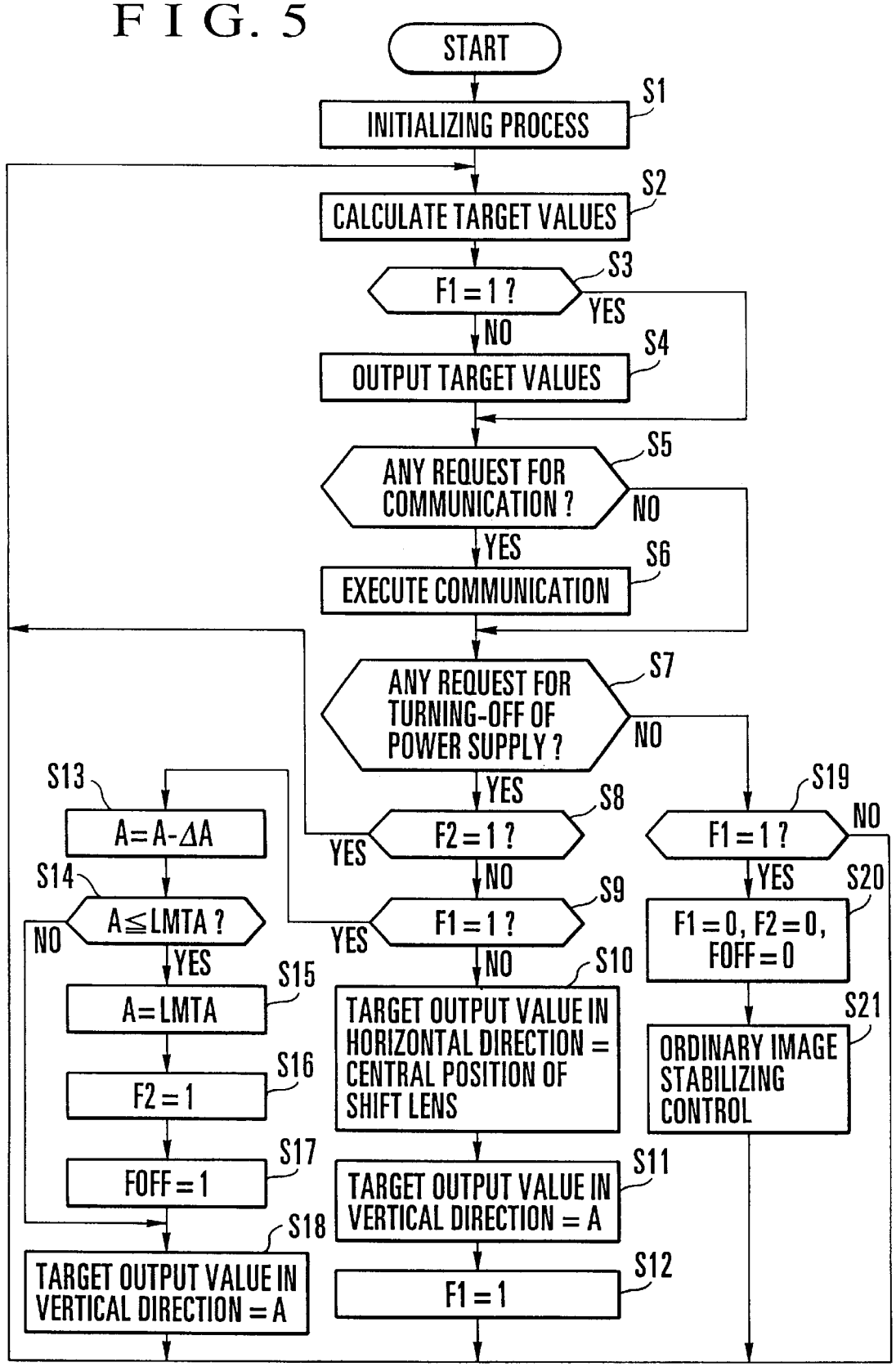
FIG. 5 is a flow chart showing a lens-position control method in the image pickup apparatus according to the first embodiment of the invention.

FIG. 5 is a flow chart showing the lens-position control method according to the first embodiment of the invention. A program for the lens-position control method is executed by the driving amount control part 31.

Referring to FIG. 5, in step S1, the whole system is initialized. By this initializing process, first and second flags F1 and F2, which will be described later, are cleared to "0".

In the next step S2, correction target values used during the image pickup operation are calculated by subjecting the vibration signals formed by the vibration signal forming circuit 30 to the predetermined filtering process at the HPFs 43p and 43y, to the phase and gain correction at the phase/gain correcting circuits 44p and 44y, and to the integration process at the integration circuits 45p and 45y.

Subsequently, in step S3, a check is made to find if the first flag F1 is set at "1". In the first cycle of loop, since the first flag F1 has been cleared to "0" in step S1, the answer in step S3 is negative (No), so that the flow proceeds to step S4. In step S4, the correction target values are outputted to drive the shift lens 7 so as to perform the correction of image shake during the image pickup operation.

In the next step S5, a check is made to find if a request for communication is received from the mode microcomputer 32. If there is no request for communion the flow proceeds to step S7. If there is the request for communication, the flow proceeds to step S6. In step S6, a communication is performed, and the flow proceeds to step S7. More specifically, the communication in step S6 is performed between the driving amount control part 31 and the mode microcomputer 32 to exchange information on a request for turning-on/off of the image stabilizing operation, a request for turning-off of the power supply, a power-supply off flag FOFF for allowing turning-off of the power supply, etc.

In step S7, a check is made through the communication with the mode microcomputer 32 to find if the request for turning-off of the power supply has been received. Incidentally, the presence or absence of the request for turning-off of the power supply is decided according to whether the power supply switch 33 is set in the off-state. If the answer in step S7 is affirmative (Yes), the flow proceeds to step SB. In step S8, a check is made to find if the second flag F2 is set at "1". In the first cycle of loop, since the second flag F2 has been cleared to "0" in step S1, the answer in step S8 is negative (No), so that the flow proceeds to step S9. In step S9, a check is made to find if the first flag F1 is set at "1". In the present cycle of loop, similarly, since the first flag F1 has been cleared to "0" in step S1, the answer in step S9 is negative (No), so that the flow proceeds to step S10.

In step S10, the target output value in the horizontal direction (yawing direction) is so set as to correspond to the central position of the shift lens 7. In the next step S11, the target output value in the vertical direction (pitching direction) is set to the predetermined value A. In this instance, the predetermined value A is such a value as not to make the outer circumferential portion of the lens holding frame 13 holding the shift lens 7 come into contact with the inner wall of the lens barrel 2. In the next step S12, the first flag F1 is set to "1", and the flow returns to step S2.

With the first flag F1 set to "1", as described above, the answer in each of step S3 and step S9 becomes affirmative (Yes) in the next and subsequent cycles of loop. Therefore, the flow proceeds from step S9 to Step S13. In step S13, the predetermined value A is set to a value obtained by subtracting a minute amount ΔA from the predetermined value A. In the next step S14, a check is made to find if the predetermined value A has reached a lowest limit value LMTA. If the answer in step S14 is negative (No), the flow proceeds to step S18. In step S18, the target output value in the vertical direction is set to the predetermined value A.

Then, when the predetermined value A has reached the lowest limit value LMTA, the driving amount control part 31 decides that such an amount of movement as to make the lens holding frame 13 come into contact with the lens barrel 2 has been attained, and the flow proceeds to step S15. In step S15, the predetermined value A is set to the lowest limit value LMTA, and in step S16, the second flag F2 is set to "1". In the next step S17, the power-supply off flag FOFF for allowing turning-off of the power supply is set to "1", and the flow proceeds to step S18. In step S18, the target output value in the vertical direction is set to the predetermined value A (=LMTA), and the flow returns to step S2. By such a processing operation, the driving of the image pickup optical system 1 is made to stop.

On the other hand, if it is determined in step S7 that the request for turning-off of the power supply is not received, the flow proceeds from step S7 to step S19. In step S19, a check is made to find if the first flag F1 is set at "1". If the answer in step S19 is negative (No), the flow returns to step S2. If the answer in step S19 is affirmative (Yes), the flow proceeds to step S20. In step S20, the first and second flags F1 and F2 and the power-supply off flag FOFF are cleared to "0", and, in step S21, the image stabilizing operation is started. Specifically, the connection of the change-over switch 47 is changed over from the side of the predetermined-value output circuit 46 to the side of the integration circuits 45p and 45y, and the correction target values are outputted from the driving amount control part 31 to execute the control of the driving amount of the shift lens 7 during the image pickup operation. Then, the flow returns to step S2.

Figure 6:
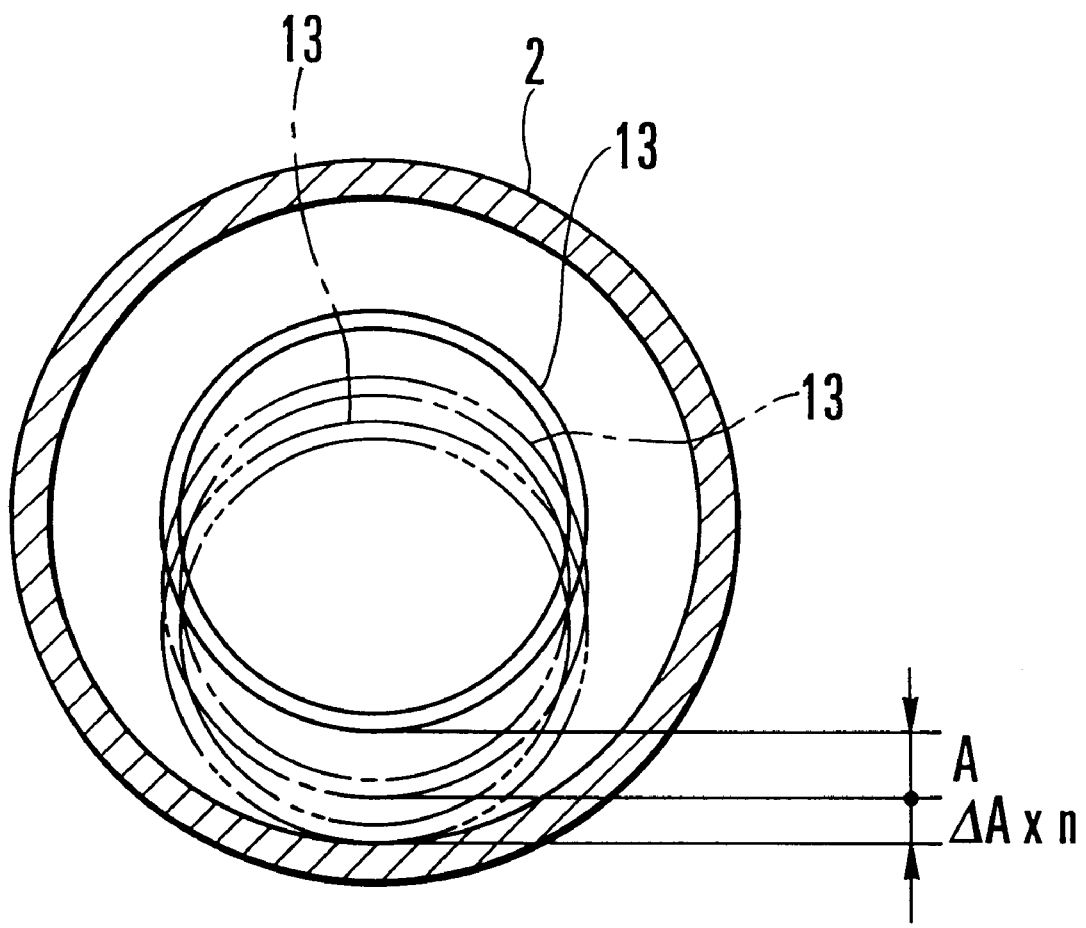
FIG. 6 is a diagram showing the manner in which the position of a shift lens varies with time in response to a request for turning off the power supply.

FIG. 6 is a diagram showing the state where the lens holding frame 13 is being driven after the request for turning-off of the power supply is received. Referring to FIG. 6, when the request for tuning-off of the power supply has been received, the lens holding frame 13 moves from a position indicated by the solid line to a position indicated by the one-dot chain line (by the amount of movement A). After that, the lens holding frame 13 moves closer to the lens barrel 2 by the minute amount ΔA, n times (ΔA×n). Finally, the lens holding frame 13 comes into contact with the lens barrel 2, as indicated by the two-dot chain line, and, after that, the power supply is turned off.

As described above, according to the first embodiment, when the mode microcomputer 32 detects the off-state of the power supply switch 33, the driving amount control part 31 decides that the request for turning-off of the power supply is received, and causes the lens holding frame 13 to instantaneously move from the position of the optical axis 4 to the position corresponding to the setting value A. After that, the driving amount control part 31 causes the thus-moved lens holding frame 13 to gradually move to the vicinity of the inner wall of the lens barrel 2 and then to come into contact with the inner wall of the lens barrel 2. Therefore, it is possible to prevent the shift lens 7 which has been set into the floating state by the image stabilizing operation from dropping due to its own weight at the time of turning-off of the power supply to generate an unpleasant collision sound between the lens holding frame 13 holding the shift lens 7 and the inner wall of the lens barrel 2.

Figure 7:
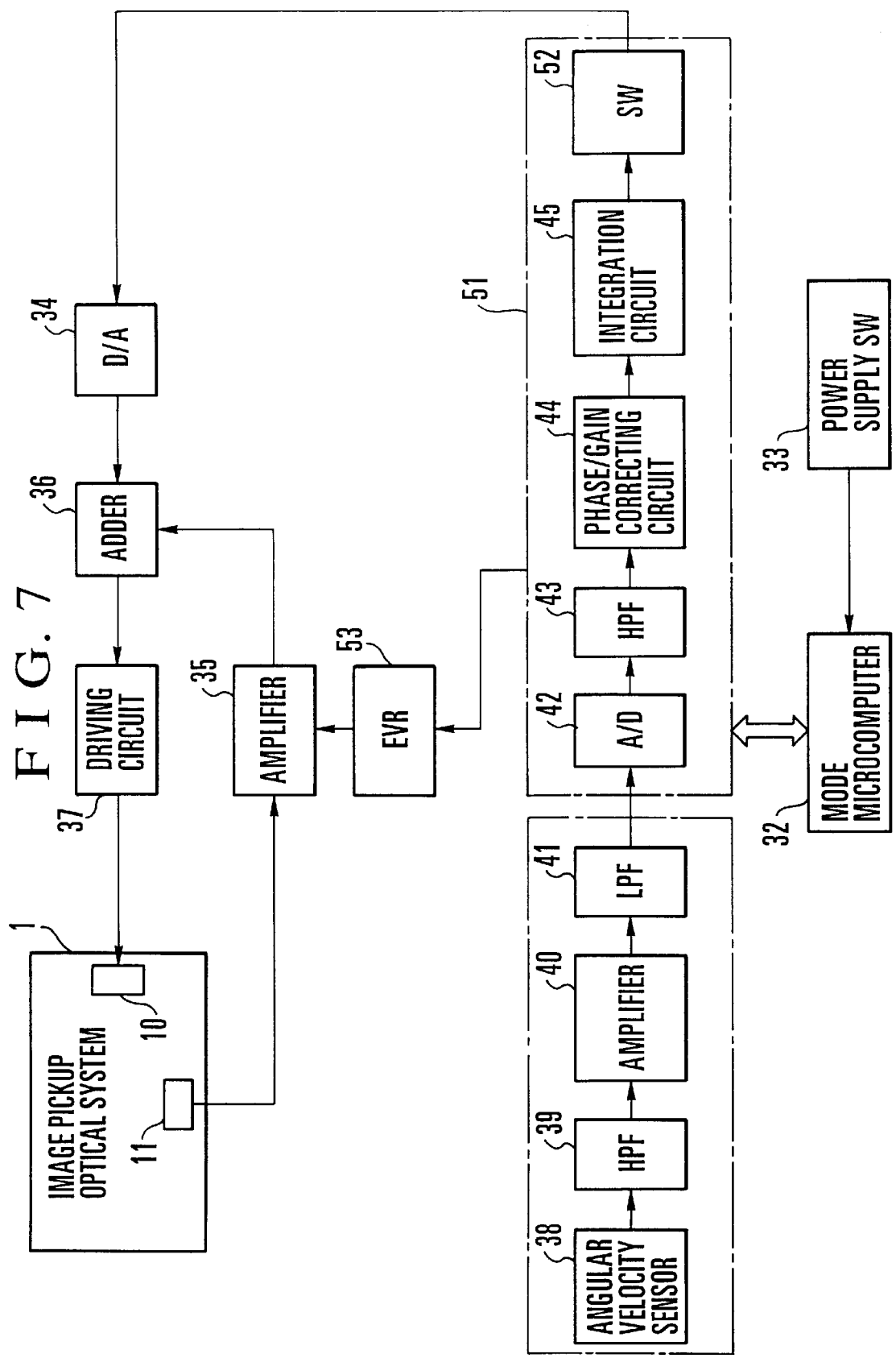
FIG. 7 is a block diagram showing the arrangement of a control system in an image pickup apparatus according to a second embodiment of the invention.

FIG. 7 is a block diagram showing the arrangement of an image pickup apparatus according to a second embodiment of the invention. In the image pickup apparatus according to the second embodiment, a driving amount control part 51 is provided with an image-stabilization turning-off switch 52, and an electronic potentiometer (EVR) 53 is interposed between the amplifier 35 and the driving amount control part 51.

Figure 8:
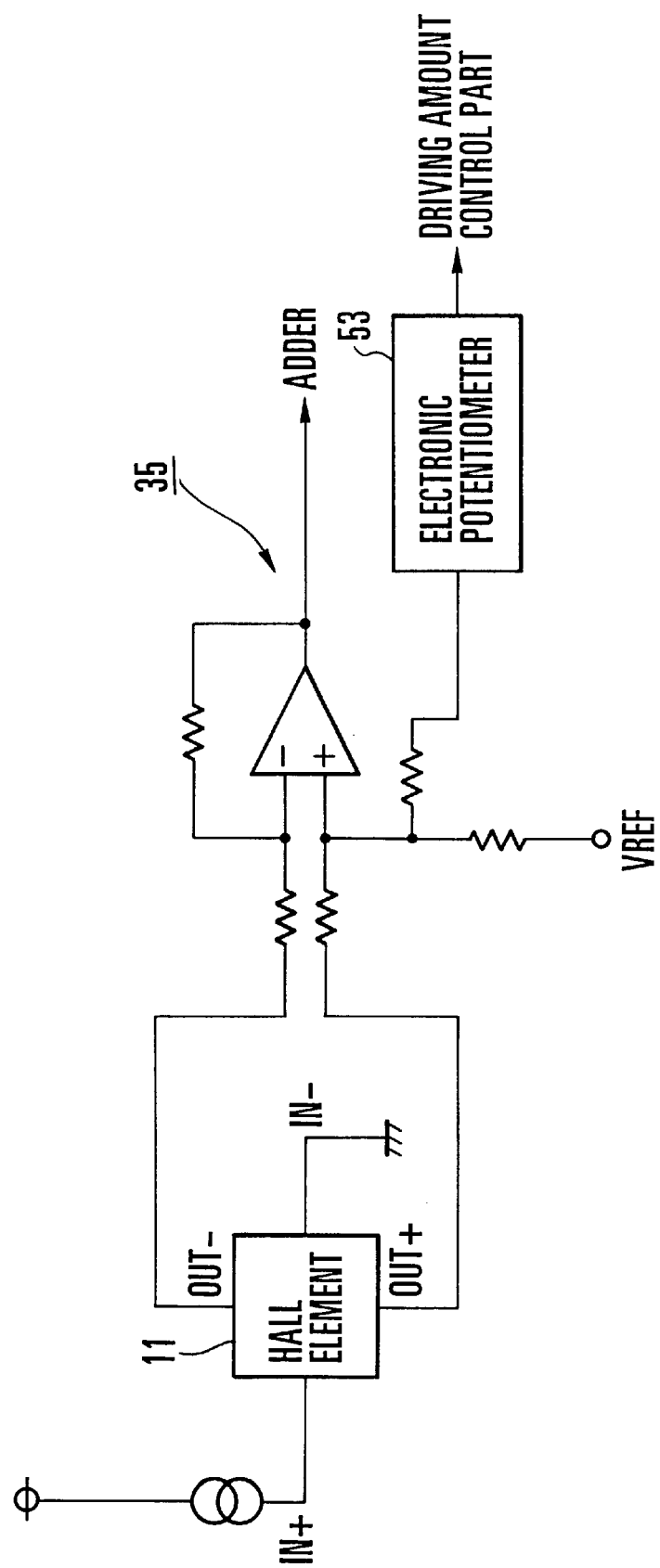
FIG. 8 is a diagram showing the circuit arrangement of essential parts according to the second embodiment of the invention.

More particularly, as shown in FIG. 8, the output terminal of the amplifier 35 and the negative output terminal of the Hall element 11 are connected to the negative input terminal of the amplifier 35, while, to the positive input terminal of the amplifier 35, there are supplied the output signal from the positive output terminal of the Hall element 11, the reference voltage VREF and the output signal from the EVR 53.

When the correction of image shaking is being performed with the power supply turned on, the output signal from the EVR 53 is supplied to the amplifier 35 in such a way as to compensate for the difference between the output signal of the Hall element 11 and the reference voltage VREF. On the other hand, when the request for turning-off of the power supply is issued with the power supply switch turned off, the output signal of the EVR 53 varies according to the request of the driving amount control part 51 so as to adjust the offset of the output of the Hall element 11.

Figure 9:
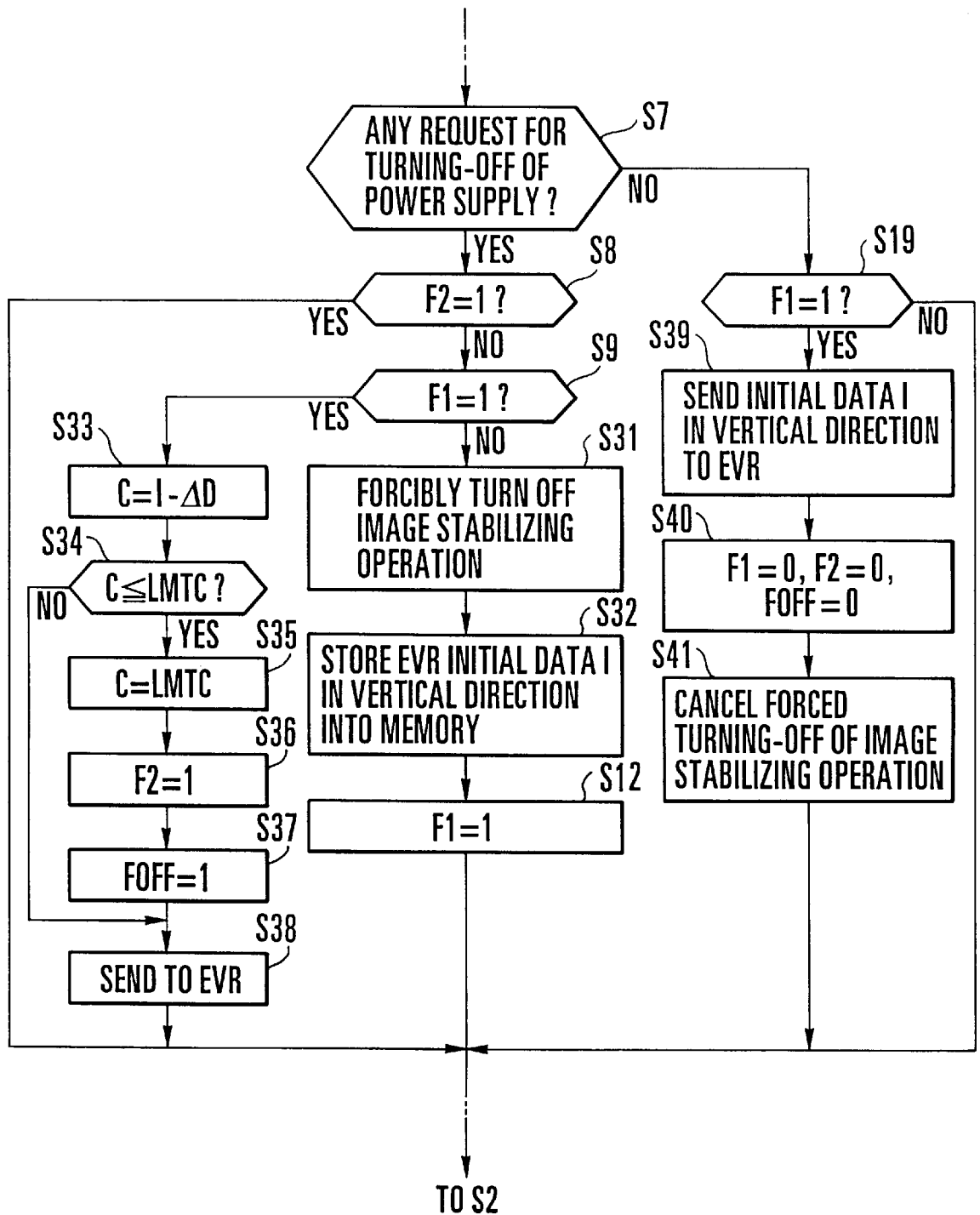
FIG. 9 is a flow chart showing essential operations according to the second embodiment of the invention.

FIG. 9 is a flow chart showing the operation of the image pickup apparatus according to the second embodiment. A program for effecting the operation of the image pickup apparatus according to the second embodiment is executed by the driving amount control part 51.

After the processing operations in steps S1 to S9 are performed similarly to those in the first embodiment (FIG. 5), if the answer in step S9 is negative (No), the flow proceeds to step S31. In step S31, the image-stabilization turning-off switch 52 is forcibly turned off, since the request for turning-off of the power supply has been issued in step S7. Accordingly, the target output value in the horizontal direction (yawing direction) is so set as to correspond to the central position of the shift lens 7. In the next step S32, EVR initial data I is stored in a memory of the driving amount control part 51. More specifically, as described above, the EVR 53 is arranged to adjust the offset of the output signal of the Hall element 11. At the time of the initial setting, data obtained after adjustment of the offset, i.e., initial data I, is sent from the driving amount control part 51 to the EVR 53, and the initial data I is stored in the memory of the driving amount control part 51.

Subsequently, in step S12, the first flag F1 is set to "1", and the flow returns to step S2.

With the first flag F1 set to "1", as described above, the answer in each of step S3 and step S9 becomes affirmative (Yes) in the next and subsequent cycles of loop. Therefore, the flow proceeds from step S9 to Step S33. In step S33, a predetermined value C is set to a value obtained by subtracting a minute amount AD from the initial data I. In the next step S34, a check is made to find if the predetermined value C is a value not greater than a lowest limit value LMTC. If the answer in step S34 is negative (No), the flow proceeds to step S38. In step S38, the target output value in the vertical direction is set to the predetermined value C, which is sent to the EVR 53. After that, the above operation is repeated. As the output value from the EVR 53 becomes smaller gradually, the output of the amplifier 35 also becomes smaller gradually approximately in proportion to the output value from the EVR 53, so that the shift lens 7 gradually moves from the central position thereof to the inner wall of the lens barrel 2.

Then, when the predetermined value C has reached the lowest limit value LMTC, the driving amount control part 51 decides that such an amount of movement as to make the lens holding frame 13 come into contact with the lens barrel 2 has been attained, and the flow proceeds to step S35. In step S35, the predetermined value C is set to the lowest limit value LMTC, and in step S36, the second flag F2 is set to "1". In the next step S37, the power-supply off flag FOFF for allowing turning-off of the power supply is set to "1", and the flow proceeds to step S38. In step S38, the target output value in the vertical direction is set to the predetermined value C (=LMTC), which is sent to the EVR 53, and the flow returns to step S2. By such a processing operation, the driving of the image pickup optical system 1 is made to stop.

On the other hand, if it is determined in step S7 that the request for turning-off of the power supply is not received, the flow proceeds from step S7 to step S19. In step S19, a check is made to find if the first flag F1 is set at "1". If the answer in step S19 is negative (No), the flow returns to step S2. If the answer in step S19 is affirmative (Yes), the flow proceeds to step S39. In step S39, the initial data I in the vertical direction is sent to the EVR 53, and the flow proceeds to step S40. In step S40, the first and second flags F1 and F2 and the power-supply off flag FOFF are cleared to "0", and, in step S41, the image stabilizing operation is started. Specifically, the off-state of the image-stabilization turning-off switch 52 is canceled, and the correction target values are outputted from the driving amount control part 51 to execute the control of the driving amount of the shift lens 7 during the image pickup operation. Then, the flow returns to step S2.

As described above, according to the second embodiment, when the mode microcomputer 32 detects a change-over to the off-state of the power supply switch 33, the driving amount control part 51 decides that the request for turning-off of the power supply is received, and causes the initial data I of the EVR 53 to be stored in the memory of the driving amount control part 51 so as to move the shift lens 7 on the basis of the initial data I. After that, the driving amount control part 51 controls the movement of the shift lens 7 on the basis of the setting value C (=I−ΔD). Therefore, the output signal from the EVR 53 also becomes smaller gradually, and, accordingly, the output signal from the amplifier 35 also becomes smaller approximately in proportion to the output signal from the EVR 53. As a result, the thus-moved lens holding frame 13 gradually moves to the vicinity of the inner wall of the lens barrel 2 and then comes into contact with the inner wall of the lens barrel 2. Therefore, it is possible to prevent the shift lens 7 which has been set into the floating state by the image stabilizing operation from dropping due to its own weight at the time of turning-off of the power supply to generate an unpleasant collision sound between the lens holding frame 13 holding the shift lens 7 and the inner wall of the lens barrel 2.

Figure 10:
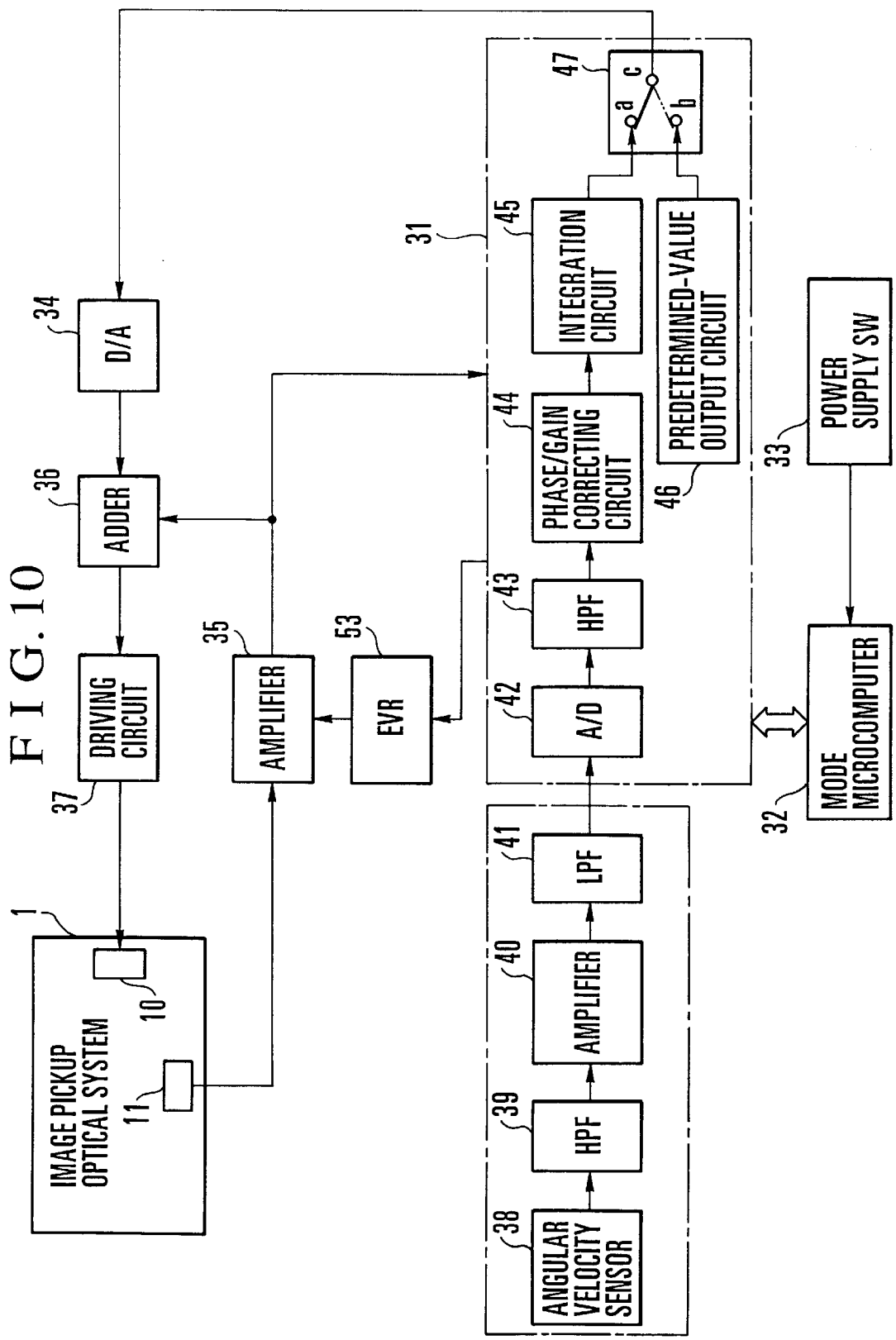
FIG. 10 is a block diagram showing the arrangement of a control system in an image pickup apparatus according to a third embodiment of the invention.

FIG. 10 is a block diagram showing the arrangement of an image pickup apparatus according to a third embodiment of the invention. Referring to FIG. 10, the image pickup apparatus according to the third embodiment is provided with the driving amount control part 31 which is the same as that in the first embodiment, and the EVR 53 is interposed between the amplifier 35 and the driving amount control part 31. Further, the feedback signal from the amplifier 35 is fed back not only to the adder 36 but also to the driving amount control part 31.

Figure 11:
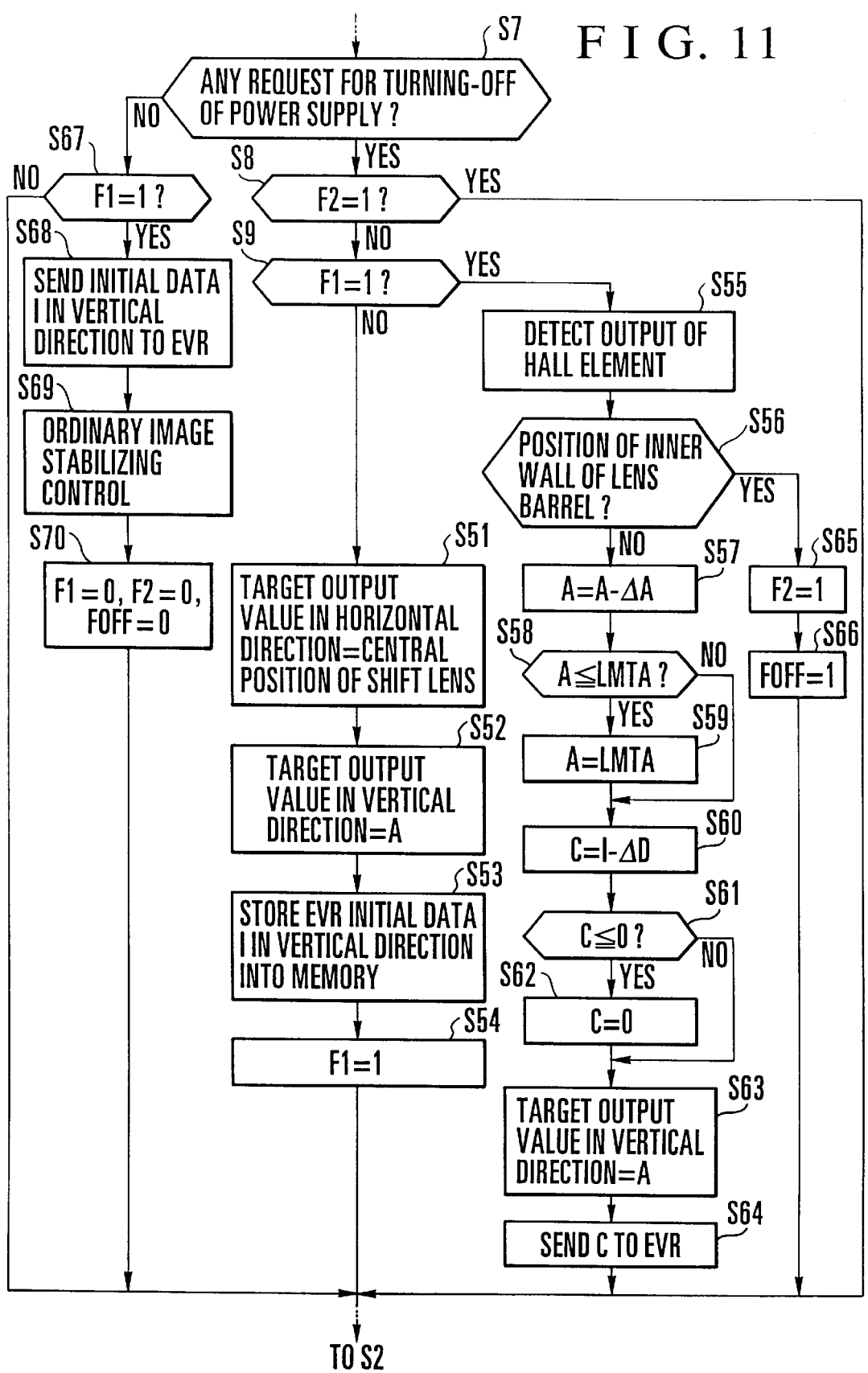
FIG. 11 is a flow chart showing essential operations according to the third embodiment of the invention.

FIG. 11 is a flow chart showing the operation of the image pickup apparatus according to the third embodiment of the invention. A program for effecting the operation of the image pickup apparatus according to the third embodiment is executed by the driving amount control part 31.

After the processing operations in steps S1 to S9 are performed similarly to those in the first and second embodiments (FIG. 5 and FIG. 9), if the answer in step S9 is negative (No), the flow proceeds to step S51. In step S51, the target output value in the horizontal direction is so set as to correspond to the central position of the shift lens 7. In the next step S52, the target output value in the vertical direction (pitching direction) is set to the predetermined value A. Then, in step S53, the EVR initial data I in the vertical direction (pitching direction) is stored in the memory of the driving amount control part 31. In the next step S54, the first flag F1 is set to "1", and the flow returns to step S2.

With the first flag F1 set to "1", as described above, the answer in each of step S3 and step S9 becomes affirmative (Yes) in the next and subsequent cycles of loop. Therefore, the flow proceeds from step S9 to Step S55. In step S55, the output of the Hall element 11 is detected. In step S56, a check is made to find if the shift lens 7 (the lens holding frame 13) is located in the position of the inner wall of the lens barrel 2. Specifically, if the theoretical position which the lens holding frame 13 holding the shift lens 7 finally reaches happens to exceed the position of the inner wall of the lens barrel 2, the consumption of electric power would increase. Therefore, according to the third embodiment, the position of the shift lens 7 is always watched by means of the Hall element 11, so that it is made possible to cause the lens holding frame 13 to stop at the position of the inner wall of the lens barrel 2, thereby reducing the consumption of electric power.

Then, if the answer in step S56 is negative (No), the flow proceeds to step S57. In step S57, the predetermined value A is set to a value obtained by subtracting a minute amount ΔA from the predetermined value A. In the next step S58, a check is made to find if the predetermined value A has become not greater than a lowest limit value LMTA. If the answer in step S58 is negative (No), the flow proceeds to step S60. In step S60, a predetermined value C is set to a value obtained by subtracting a minute amount ΔD from the initial data I. In the next step S61, a check is made to find if the predetermined value C is a value not greater than "0". If the answer in step S61 is negative (No), the flow proceeds to step S63. In step S63, the target output value in the vertical direction is set to the predetermined value A. In the next step S64, the predetermined value C is sent to the EVR 53, and the flow returns to step S2.

On the other hand, if the answer in step S58 is affirmative (Yes), the flow proceeds to step S59. In step S59, the predetermined value A is set to the lowest limit value LMTA, and the flow proceeds to step 60, where the above-described processing operation is performed. Then, if the answer in step S61 becomes affirmative (Yes), the flow proceeds to step S62. In step S62, the predetermined value C is set to "0". Subsequently, the above-described processing operations in steps S63 and S64 are performed, and the flow returns to step S2.

If the answer in step S56 is affirmative (Yes), i.e., when it is decided that the lens holding frame 13 has reached the inner wall of the lens barrel 2, the flow proceeds to step S65. In step S65, the second flag F2 is set to "1". In the next step S66, the power-supply off flag FOFF is set to "1", and the flow returns to step S2.

On the other hand, if it is decided in step S7 that there is no request for turning-off of the power supply, the flow proceeds to step S67. In step S67, a check is made to find if the first flag F1 is set at "1". If the answer in step S67 is negative (No), the flow returns to step S2. If the answer in step S67 is affirmative (Yes), the flow proceeds to step S68. In step S68, the initial data I in the vertical direction is sent to the EVR 53. In the next step S69, the ordinary image stabilizing operation is performed. Then, in step S70, the first and second flags F1 and F2 and the power-supply off flag FOFF are cleared to "0", and the flow returns to step S2.

As described above, according to the third embodiment, when there is the request for turning-off of the power supply, the movement of the shift lens 7 is controlled by using two values, i.e., the predetermined value A and the predetermined value C. The reason for this is as follows.

If the magnification varying ratio of the variator lens 5 becomes a high value of 10× or more, as in the image pickup apparatuses in recent years, the so-called "remainder of image shake" becomes conspicuous during the ordinary image stabilizing operation in a case where the resolving power of the image pickup apparatus is not high. Therefore, if the image pickup apparatus is so set as to heighten the resolving power thereof with respect to the actually-usable moving range of the shift lens 7, there occur cases where, in the current image pickup apparatuses, it becomes impossible to cause the lens holding frame 13 to reach the inner wall of the lens barrel 2 however varied the output of the driving amount control part 31 is. Further, with regard to the offset, too, if the resolving power for operation of the shift lens 7 with respect to data to be sent to the EVR 53 is not heightened, in the case of the variator lens 5 having a high magnification varying ratio, the deviation of the optical axis 4 from the central axis of the image pickup optical system becomes conspicuous during the zooming operation even if the optical axis 4 slightly deviates. Accordingly, taking the above cases into consideration, it is necessary to heighten the resolving power for operation of the shift lens 7. In this case, too, however, there is a case where the lens holding frame 13 becomes unable to reach the inner wall of the lens barrel 2 no matter how varied the output of the EVR 53 is.

Therefore, according to the third embodiment, the predetermined value A and the predetermined value C are used to control the shift lens 7 upon receipt of the request for turning-off of the power supply.

Further, when the mode microcomputer 32 detects a change-over to the off-state of the power supply switch 33, the driving amount control part 31 decides that the request for turning-off of the power supply is received, and causes the initial data I of the EVR 53 to be stored in the memory of the driving amount control part 31 so as to move the shift lens 7 on the basis of the initial data I. After that, the driving amount control part 31 controls the movement of the shift lens 7 on the basis of the setting value C (=I−ΔD), so that the thus-moved lens holding frame 13 gradually moves to the vicinity of the inner wall of the lens barrel 2 and then comes into contact with the inner wall of the lens barrel 2. Therefore, it is possible to prevent the shift lens 7 which has been set into the floating state by the image stabilizing operation from dropping due to its own weight at the time of turning-off of the power supply to generate an unpleasant collision sound between the lens holding frame 13 holding the shift lens 7 and the inner wall of the lens barrel 2.

Figure 12:
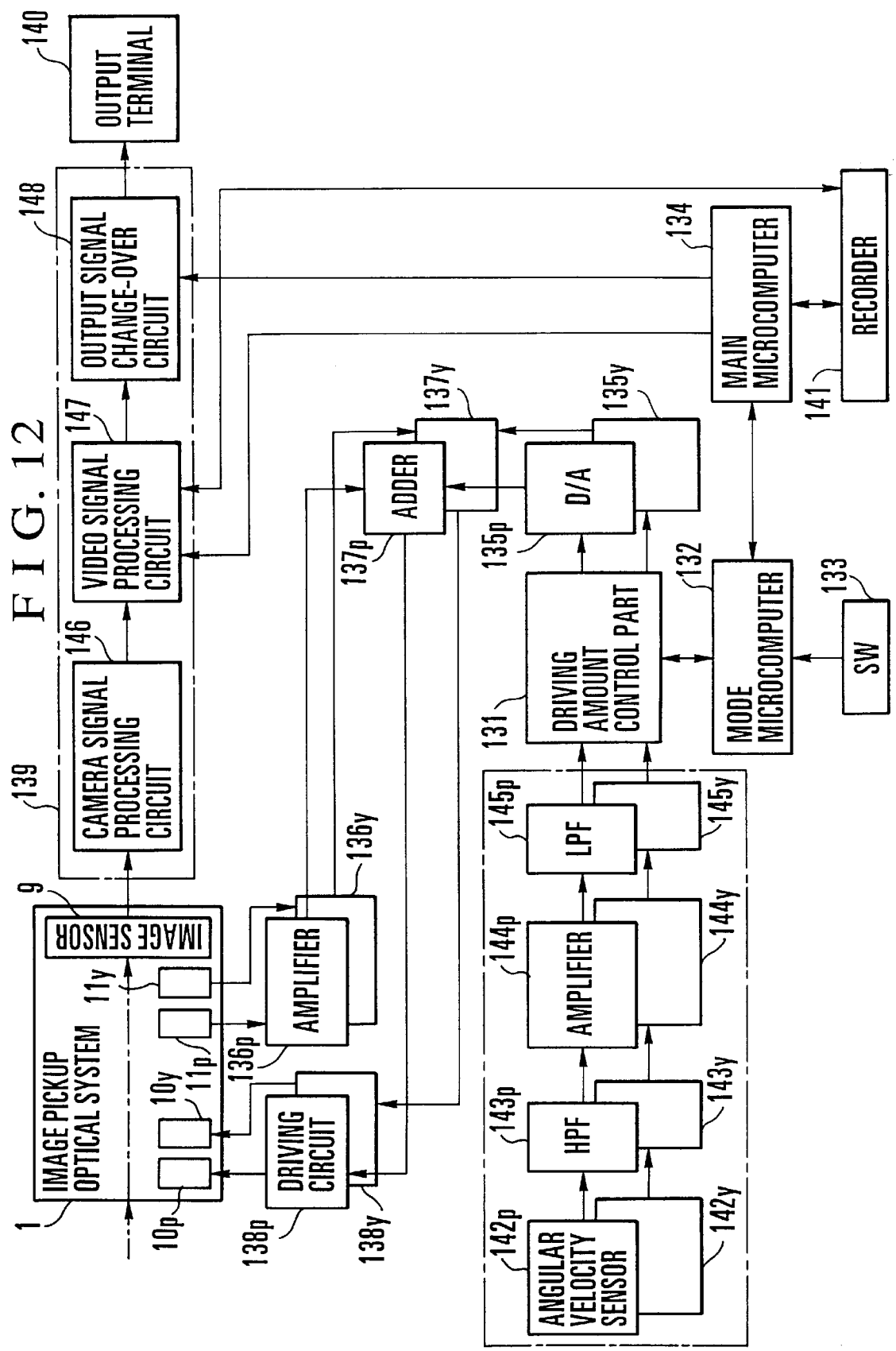
FIG. 12 is a block diagram showing the arrangement of a control system in an image pickup apparatus according to a fourth embodiment of the invention.

FIG. 12 is a block diagram showing the arrangement of a control system of an image pickup apparatus according to a fourth embodiment of the invention. Referring to FIG. 12, the image pickup apparatus is provided with the above-mentioned image pickup optical system 1, a vibration signal forming circuit 130 arranged to detect the vibration of the body of the image pickup apparatus to form vibration signals, a driving amount control part 131 arranged to control the amounts of driving of the shift lens 7 on the basis of outputs of the vibration signal forming circuit 130, etc., a mode microcomputer 132 arranged to watch the operation state of the image pickup apparatus body, a power supply switch 133 arranged to be operated to start the power supply of the image pickup apparatus body, a main microcomputer 134 arranged to control the whole image pickup apparatus, D/A converters 135p and 135y arranged to convert the digital signals outputted from the driving amount control part 131 into analog signals, amplifiers 136p and 136y arranged to amplify the output signals of the Hall elements 11p and 11y, adders 137p and 137y arranged to add the feedback signals from the amplifiers 136p and 136y to the output signals of the D/A converters 135p and 135y, driving circuits 138p and 138y arranged to drive the voice coil motors 10p and 10y on the basis of the output signals of the adders 137p and 137y, an image processing circuit 139 arranged to perform predetermined image processing on an electrical signal obtained by the photoelectric conversion by the image sensor 9, an output terminal 140 arranged to output image data processed by the image processing circuit 139 to a display device (not shown) such as an LCD, and a recorder 141 arranged to record the processed image data on a recording medium such as a magnetic tape.

The vibration signal forming circuit 130, more particularly, includes angular velocity sensors 142p and 142y disposed at appropriate portions of the image pickup optical system 1 to detect the vibration angles of the image pickup apparatus body, high-pass filters (HPFs) 143p and 143y arranged to remove DC components from the detection signals outputted from the angular velocity sensors 142p and 142y, amplifiers 144p and 144y arranged to amplify the output signals of the HPFs 143p and 143y, and low-pass filters (LPFs) 145p and 145y arranged to remove predetermined high-frequency components from the output signals of the amplifiers 144p and 144y to form the vibration signals.

The image processing circuit 139 includes a camera signal processing circuit 146 arranged to perform predetermined image pickup processing on the electrical signal obtained by the photoelectric conversion by the image sensor 9 to form a camera signal, a video signal processing circuit 147 arranged to perform predetermined video processing on the camera signal outputted from the camera signal processing circuit 146 to form a video signal or to convert the formed video signal into an RF (radio frequency) signal and output the RF signal to the recorder 141, and an output signal change-over circuit 148 arranged to change over output signals.

Figure 13:
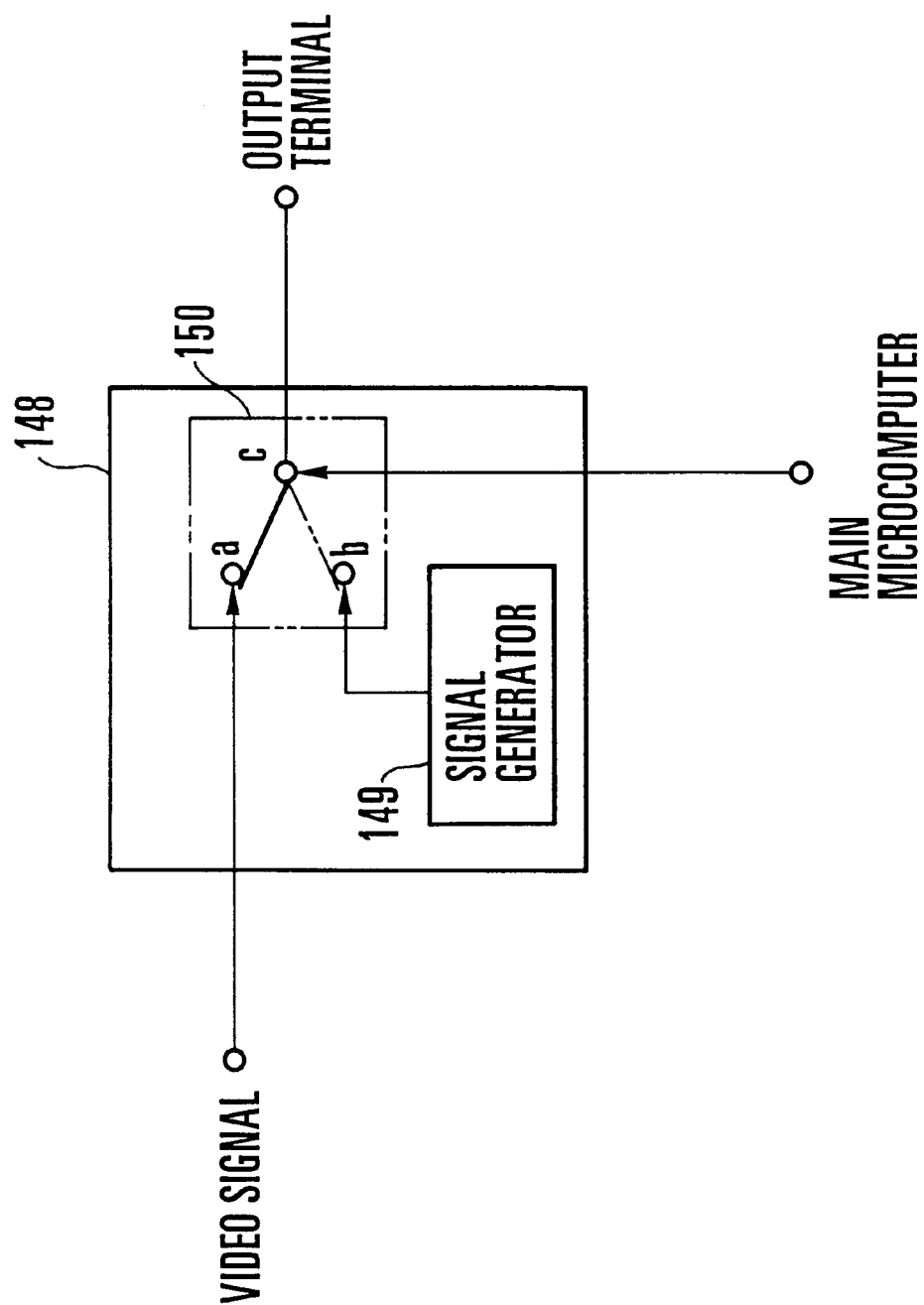
FIG. 13 is an electric circuit diagram showing the details of an output signal change-over circuit shown in FIG. 12.

The output signal change-over circuit 148 includes, as shown in FIG. 13, a signal generator 149 arranged to generate a black signal as a predetermined luminance level signal, and a change-over switch 150. To the contact "a" of the change-over switch 150 is supplied the video signal, to the contact "b" of the change-over switch 150 is supplied the black signal from the signal generator 149, and to the contact "c" of the change-over switch 150 is supplied an output signal of the main microcomputer 134. According to the above arrangement, the contact "c" of the change-over switch 150 is connected to the contact "a" or the contact "b" depending on the output signal of the main microcomputer 134, so that the video signal or the black signal is outputted from the output signal change-over circuit 148. Incidentally, while in the fourth embodiment the predetermined luminance level signal to be outputted from the signal generator 149 is a black signal, it may be changed to a particular color signal, such as a white signal, other than the black signal.

Figure 14:
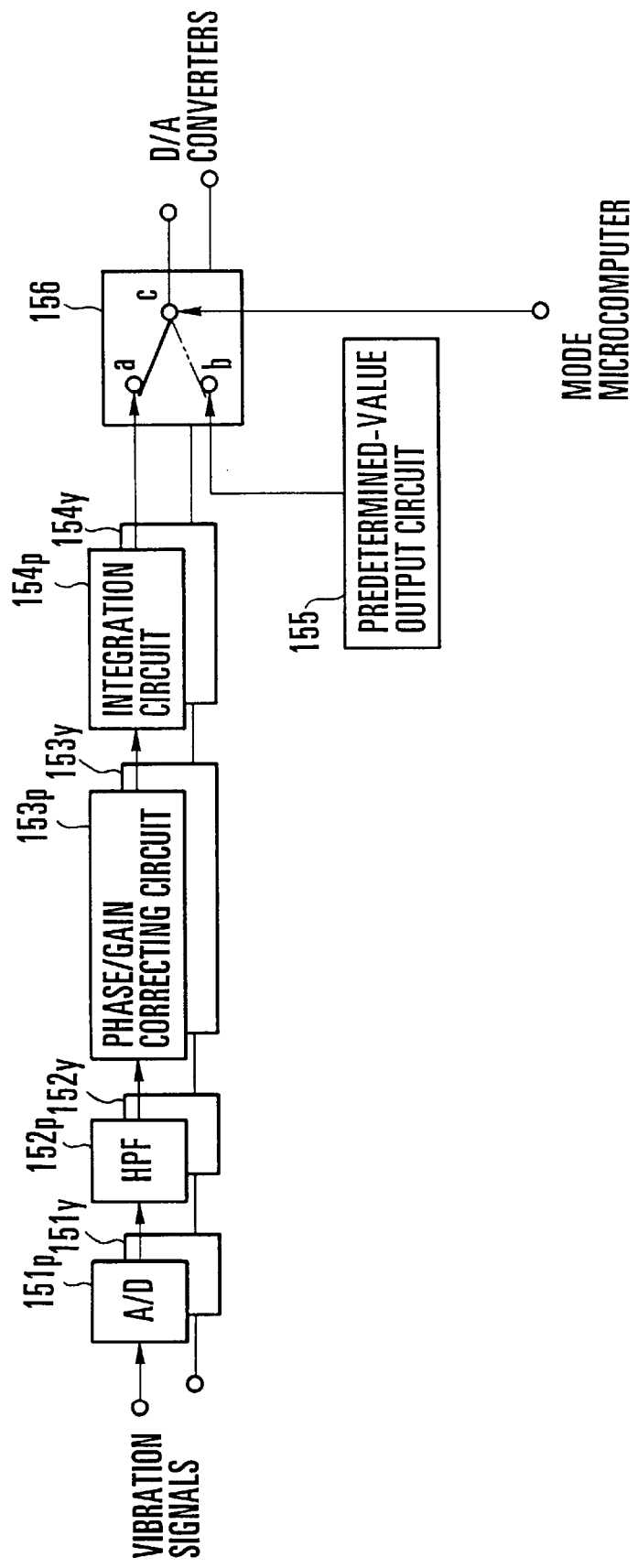
FIG. 14 is a block diagram showing the details of a driving amount control part shown in FIG. 12.

Further, the driving amount control part 131 includes, as shown in FIG. 14, A/D converters 151$p$ and 151$y$ arranged to convert the analog vibration signals outputted from the vibration signal forming circuit 130 into digital vibration signals, HPFs 152$p$ and 152$y$ arranged to remove predetermined low-frequency components from the output signals of the A/D converters 151$p$ and 151$y$, phase/gain correcting circuits 153$p$ and 153$y$ arranged to correct the phase and/or gain of the output signals of the HPFs 152$p$ and 152$y$, integration circuits 154$p$ and 154$y$ arranged to integrate the output signals of the phase/gain correcting circuits 153$p$ and 153$y$ to form correction target values for correcting the image shake, a predetermined-value output circuit 155 arranged to output a lens-movement target value (a predetermined value X) which is desired irrespective of the vibration signals from the vibration signal forming circuit 130, and a change-over switch 156 arranged to change over the output signals of the integration circuits 154$p$ and 154$y$ and the output signal of the predetermined-value output circuit 155. The contact "a" of the change-over switch 156 is connected to the integration circuits 154$p$ and 154$y$, the contact "b" of the change-over switch 156 is connected to the predetermined-value output circuit 155, and the contact "c" of the change-over switch 156 is connected to the mode microcomputer 132. Then, the contact "c" of the change-over switch 156 is connected to the contact "a" or the contact "b" depending on the signal from the mode microcomputer 132, which watches the state of the power supply switch 133, so that the correction target values from the integration circuits 154$p$ and 154$y$ or the predetermined value X from the predetermined-value output circuit 155 is outputted from the change-over switch 156.

In the image pickup apparatus having the above construction, when the power supply switch 133 is turned on, the mode microcomputer 132 notifies the main microcomputer 134 of the turning-on of the power supply switch 133. The main microcomputer 134 decides the power supply to have been turned on and starts its control operation.

Then, when the angular velocity sensors 142$p$ and 142$y$ detect the vibration of the image pickup apparatus body, the HPFs 143$p$ and 143$y$, the amplifiers 144$p$ and 144$y$ and the LPFs 145$p$ and 145$y$ perform predetermined processing to form vibration signals. The formed vibration signals are supplied to the driving amount control part 131. In the driving amount control part 131, correction target values are calculated via the A/D converters 151$p$ and 151$y$, the HPFs 152$p$ and 152$y$, the phase/gain correcting circuits 153$p$ and 153$y$ and the integration circuits 154$p$ and 154$y$. The calculated correction target values are outputted to the D/A converters 135$p$ and 135$y$ via the change-over switch 156.

Subsequently, the correction target values, which have been converted into analog signals by the D/A converters 135$p$ and 135$y$, are supplied to the adders 137$p$ and 137$y$, where the analog correction target values are added to the feedback signals supplied from the Hall elements 11$p$ and 11$y$ via the amplifiers 36$p$ and 36$y$. Then, the output signals of the adders 137$p$ and 137$y$ are supplied to the driving circuits 138$p$ and 138$y$. The driving circuits 138$p$ and 138$y$ issue driving signals to the voice coil motors 10$p$ and 10$y$ to two-dimensionally drive the shift lens 7 in the vertical direction and in the horizontal direction within a plane perpendicular to the optical axis 4 during the image pickup operation on an object image.

The object image as being picked up is formed on the image sensor 9 so as to be photoelectrically converted into an electrical signal. The electrical signal obtained by the photoelectric conversion is supplied to the output terminal 140 via the camera signal processing circuit 146, the video signal processing circuit 147 and the output signal change-over circuit 148, in turn. The electrical video signal outputted from the output terminal 140 is supplied to a display device such as an LCD so as to be displayed as a visual video image. Further, the RF signal obtained by the video signal processing circuit 147 is sent to the recorder 141 and is then recorded on a recording medium such as a magnetic tape.

On the other hand, when the power supply switch 133 is changed over from the on-state to the off-state, a notice of the change-over of the state of the power supply switch 133 is given to the mode microcomputer 132 and, then, to the main microcomputer 134. The main microcomputer 134, which has received such a notice from the mode microcomputer 132, restrains the video signal processing circuit 147 from outputting the RF signal, thereby stopping the recording operation of the recorder 141, and, at the same time, notifies the contact "c" of the change-over switch 150 of the output signal change-over circuit 148 that the power supply switch 133 has been turned off. Accordingly, the connection of the contact "c" of the change-over switch 150 is changed over from the contact "a" to the contact "b", so that the output terminal 140 is made to be supplied with the black signal from the signal generator 149.

Subsequently, after the lapse of a predetermined period of time since the power supply switch 133 has been changed over from the on-state to the off-state, the connection of the change-over switch 156 of the driving amount control part 131 is changed over from the side of the integration circuits 154$p$ and 154$y$ to the side of the predetermined-value output circuit 155. Specifically, since, even if the power supply switch 133 is changed over from the on-state to the off-state, it takes a predetermined period of time (for example, 20 V (vertical synchronizing period) (about 16.7 msec in NTSC, or about 20 msec in PAL)) to completely stop the recording operation of the recorder 141 on the RF signal supplied from the video signal processing circuit 147, it is after the lapse of such a predetermined period of time that the connection of the change-over switch 156 of the driving amount control part 131 is changed over from the side of the integration circuits 154$p$ and 154$y$ to the side of the predetermined-value output circuit 155. Accordingly, the predetermined value X, instead of the correction target values, is outputted from the driving amount control part 131, so that the shift lens 7 is made to be driven on the basis of the predetermined value X.

Figure 15:
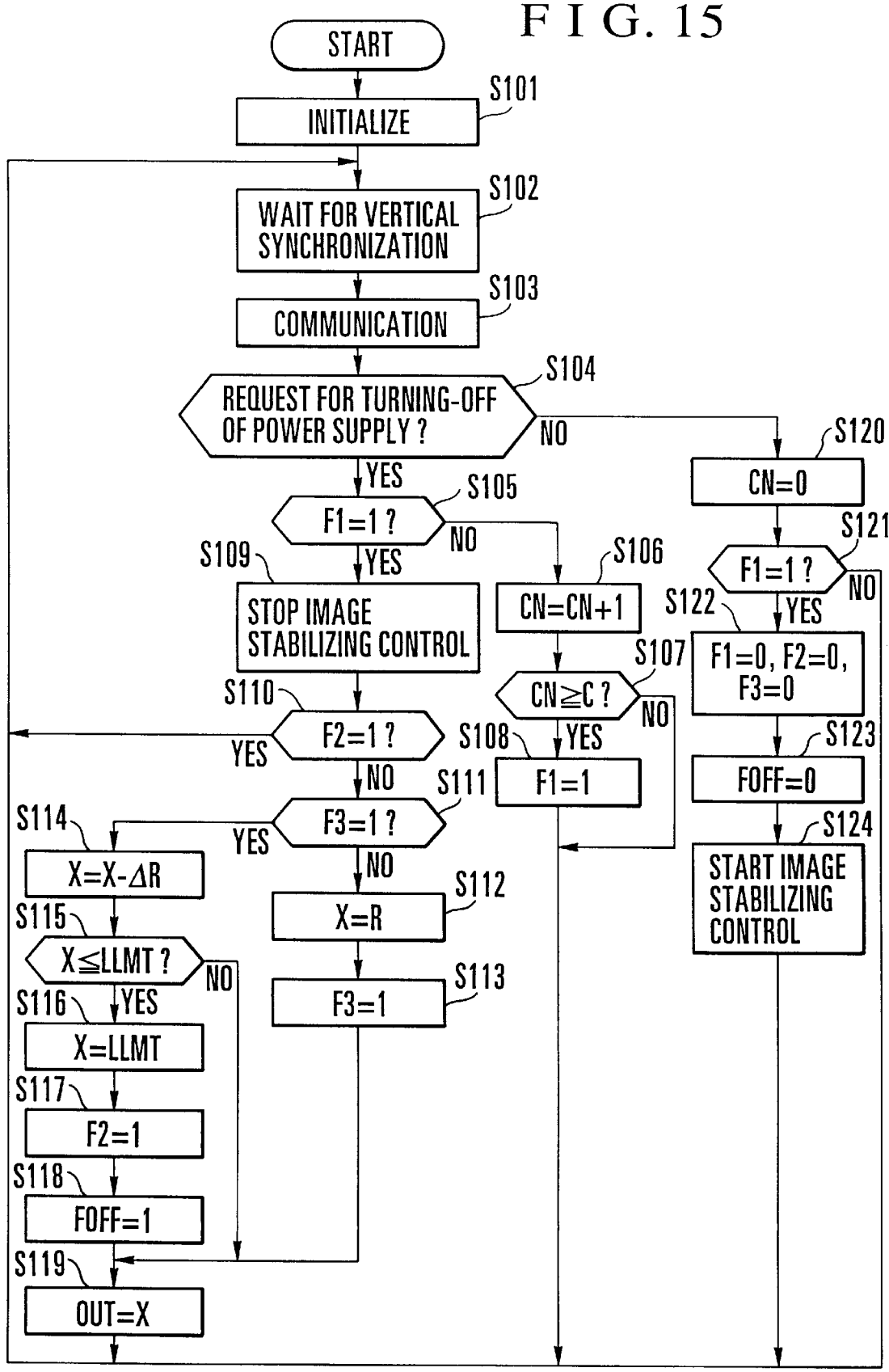
FIG. 15 is a flow chart showing a lens-position control method in the image pickup apparatus according to the fourth embodiment of the invention.

FIG. 15 is a flow chart showing the lens-position control method according to the fourth embodiment of the invention. A program for the lens-position control method is executed by the driving amount control part 131.

Referring to FIG. 15, in step S101, the whole system is initialized. By this initializing process, first to third flags F1 to F3, which will be described later, are cleared to "0".

In the next step S102, the flow waits for the vertical scanning operation to be synchronized. By this vertical synchronization, processing operations subsequent to step S102 are performed once per field.

In step S103, the driving amount control part 131 makes communication with the mode microcomputer 132. More specifically, the driving amount control part 131 exchanges, with the mode microcomputer 132, information on a request for turning-on/off of the image stabilizing operation, a request for turning-off of the power supply, a power-supply off flag FOFF for allowing turning-off of the power supply, etc.

In the next step S104, a check is made through the communication with the mode microcomputer 132 to find if the request for turning-off of the power supply has been received. If the answer in step S104 is affirmative (Yes), the flow proceeds to step S105. In step S105, a check is made to find if the first flag F1 is set at "1". In the first cycle of loop, since the first flag F1 has been cleared to "0" in step S101, the answer in step S105 is negative (No), so that the flow proceeds to step S106. In step S106, a count value CN of a counter incorporated in the driving amount control part 131 is incremented by one, and the flow proceeds to step S107. In step S107, a check is made to find if the count value C is not less than a setting value C. In this instance, the setting value C is a value equivalent to a predetermined period of time required for the lapse of 20 V (about 16.7 msec in NTSC or about 20 msec in PAL) according to the recording operation state of the recorder 141 upon receipt of the request for turning-off of the power supply. If the answer in step S107 is negative (No), the flow returns to step S102 to repeat the above processing operation until the count value CN of the counter reaches the setting value C, i.e., the predetermined period of time elapses. When the count value CN of the counter reaches the setting value C, the flow proceeds from step S107 to step S108. In step S8, the first flag F1 is set to "1", and the flow returns to step S102.

With the first flag F1 set to "1", as described above, the answer in step S105 becomes affirmative (Yes). Therefore, the flow proceeds to step S109 to stop the image stabilizing operation. Specifically, the connection of the change-over switch 156 is changed over from the side of the integration circuits 154p and 154y to the side of the predetermined-value output circuit 155.

Subsequently, in step S110, a check is made to find if the second flag F2 is set at "1". In this cycle of loop, since there is maintained the state where the second flag F2 has been set to "0" in step S101, the answer in step S110 is negative (No), and the flow proceeds to step S111. In step S111, a check is made to find if the third flag F3 is set at "1". In this cycle of loop, also, since there is maintained the state where the third flag F3 has been set to "0" in step S101, the answer in step S111 is negative (No), and the flow proceeds to step S112. In step S112, the predetermined value X is set to a value "R". In this instance, the value "R" is such a value as not to make the outer circumferential portion of the lens holding frame 13 holding the shift lens 7 come into contact with the inner wall of the lens barrel 2.

In the next step S113, the third flag F3 is set to "1", and the flow proceeds to step S119. In step S119, the predetermined value X is outputted as an output value OUT of the driving amount control part 131, and the flow returns to step S102. By the above processing operation, the lens holding frame 13 is made to instantaneously move up to the vicinity of the inner wall of the lens barrel 2.

With the third flag F3 set to "1", as described above, the answer in step S111 becomes affirmative (Yes) in the next and subsequent cycles of loop. Therefore, the flow proceeds from step S111 to Step S114. In step S114, the predetermined value X is set to a value obtained by subtracting a minute amount AR from the predetermined value X. In the next step S115, a check is made to find if the predetermined value X has become a value not greater than a lowest limit value LLMT. If the answer in step S115 is negative (No), the flow proceeds to step S119. In step S119, the predetermined value X (=X−ΔR) is outputted as the output value OUT of the driving amount control part 131, and the flow returns to step S2.

Then, the above processing operation is repeated until the predetermined value X reaches the lowest limit value LLMT. When the predetermined value X has become not greater than the lowest limit value LLMT, the driving amount control part 131 decides that such an amount of movement as to make the lens holding frame 13 come into contact with the lens barrel 2 has been attained, and the flow proceeds to step S116. In step S116, the predetermined value X is set to the lowest limit value LLMT, and in step S117, the second flag F2 is set to "1". In the next step S118, the power-supply off flag FOFF for allowing turning-off of the power supply is set to "1", and the flow proceeds to step S119. In step S119, the predetermined value X is outputted as the output value OUT of the driving amount control part 131, and the flow returns to step S102. By such a processing operation, the driving of the image pickup optical system 1 is made to stop.

On the other hand, if it is determined in step S104 that the request for turning-off of the power supply is not received, i.e., if the power supply switch 133 is not turned off, the flow proceeds from step S104 to step S20. In step S120, the count value CN of the counter is cleared to "0". In the next step S121, a check is made to find if the first flag F1 is set at "1". If the answer in step S121 is negative (No), the flow returns to step S102. If the answer in step S121 is affirmative (Yes), the flow proceeds to step S122. In step S122, the first to third flags F1 to F3 are cleared to "0". In the next step S123, the power-supply off flag FOFF is cleared to "0", and, in step S124, the image stabilizing operation is started. Then, the flow returns to step S102. Specifically, the connection of the change-over switch 156 is changed over from the side of the predetermined-value output circuit 155 to the side of the integration circuits 154p and 154y, and the correction target values are outputted from the driving amount control part 131 to execute the control of the driving amount of the shift lens 7 during the image pickup operation.

Figure 16:
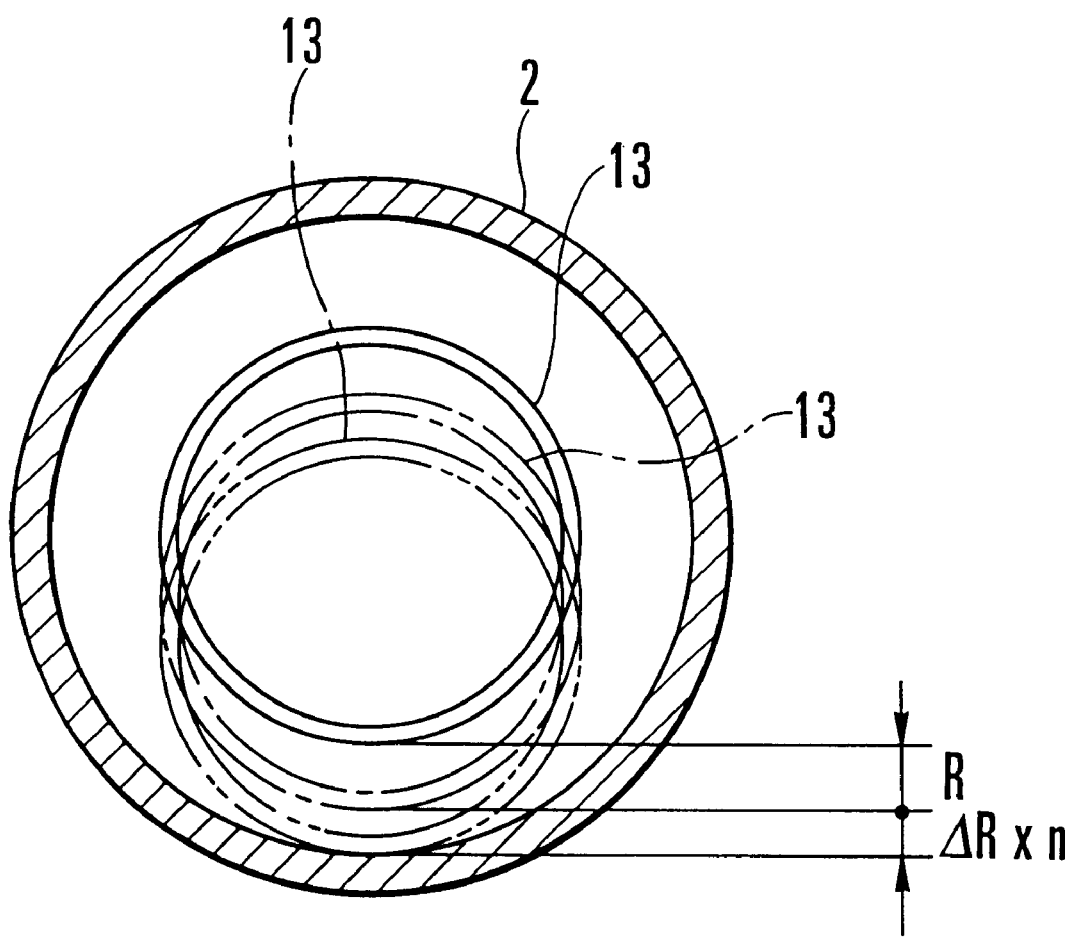
FIG. 16 is a diagram showing the manner in which the position of a shift lens varies with time in response to a request for turning off the power supply.

FIG. 16 is a diagram showing the state where the lens holding frame 13 is being driven after the request for turning-off of the power supply is received. Referring to FIG. 16, when a predetermined period of time equivalent to, for example, 20 V has elapsed after the receipt of the request for tuning-off of the power supply, the lens holding frame 13 moves from a position indicated by the solid line to a position indicated by the one-dot chain line (by the amount of movement R). After that, the lens holding frame 13 moves closer to the lens barrel 2 by the minute amount ΔR, n times (ΔR×n). Finally, the lens holding frame 13 comes into contact with the lens barrel 2, as indicated by the two-dot chain line, and, after that, the power supply is turned off.

As described above, according to the fourth embodiment, when the mode microcomputer 132 gives notice of the change-over to tuning-off of the power supply switch 133, the main microcomputer 134 stops the recording operation of the recorder 141 and changes over the connection of the output signal change-over circuit 148 from the side of the video signal processing circuit 147 to the side of the signal generator 149 so as to output the black signal. Subsequently, after the lapse of a predetermined period of time, the lens holding frame 13 is instantaneously moved from the position of the optical axis 4 to the position corresponding to the setting value R. After that, the thus-moved lens holding frame 13 is gradually moved to the vicinity of the inner wall of the lens barrel 2 and is then made to come into contact with the inner wall of the lens barrel 2. Therefore, it is possible to prevent the shift lens 7 which has been set into the floating state by the image stabilizing operation from dropping due to its own weight at the time of turning-off of the power supply to generate an unpleasant collision sound between the lens holding frame 13 holding the shift lens 7 and the inner wall of the lens barrel 2. Further, it is possible to prevent an unnatural video image motion caused by the deviation of the optical axis 4 during the process of movement of the shift lens 7 at the time of turning-off of the power supply from being outputted to a display device or being recorded on a magnetic tape.

Incidentally, the invention is not limited to the above embodiments. While in the above embodiments it is decided that the request for turning-off of the power supply has been issued when the change-over to the off-state of the power supply switch has been detected, it may be decided that the request for turning-off of the power supply has been issued when the remaining amount of a battery mounted in the image pickup apparatus has become less than a predetermined value.

Further, according to a fifth embodiment of the invention, for example, the main microcomputer 134 always watches the recorder 141, and, when the mode microcomputer 132 has detected the request for turning-off of the power supply, the driving amount control part 131 changes the change-over timing of the change-over switch 156 according the recording operation state of the recorder 141.

FIGS. 17(a) to 17(e) are timing charts showing the operation at the time of turning-off of the power supply in the fifth embodiment of the invention.

Figure 17:
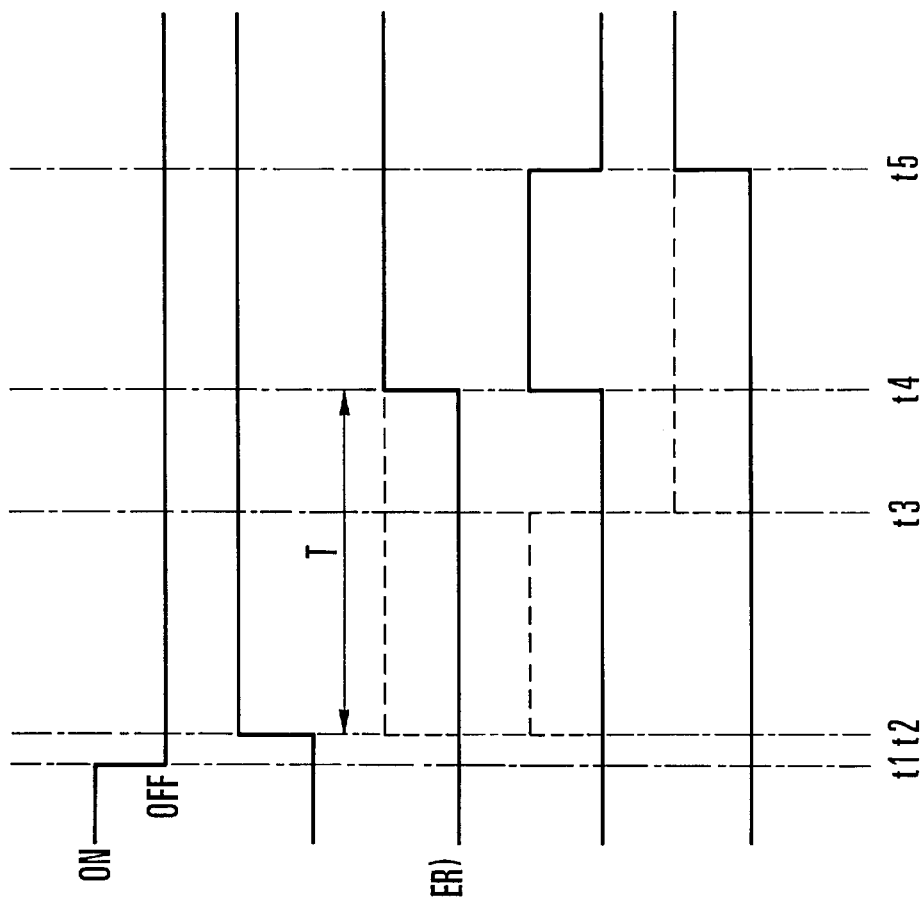
FIGS. 17(a) to 17(e) are timing charts showing a lens-position control method in an image pickup apparatus according to a fifth embodiment of the invention.
Figure 18:
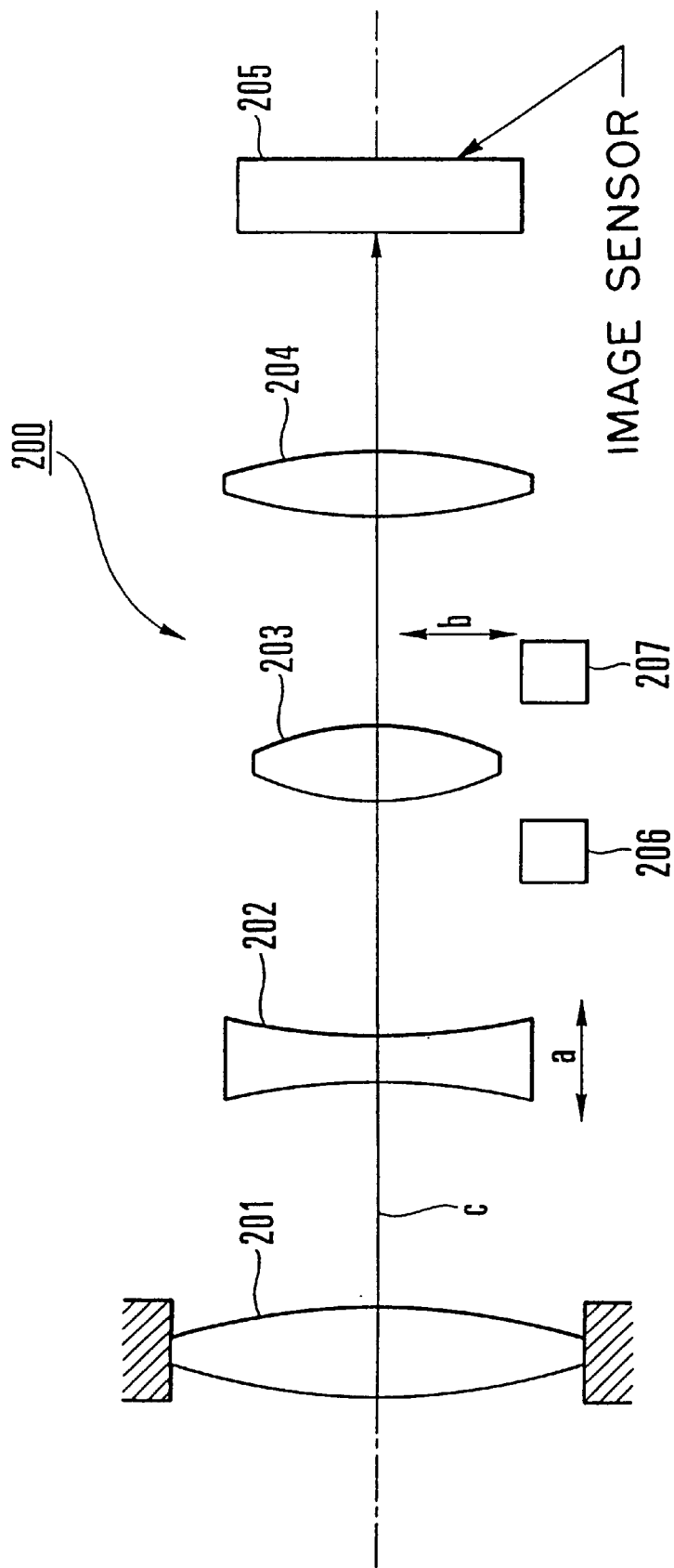
FIG. 18 is a schematic diagram showing the lens arrangement of a conventional image pickup optical system.
Figure 19A:
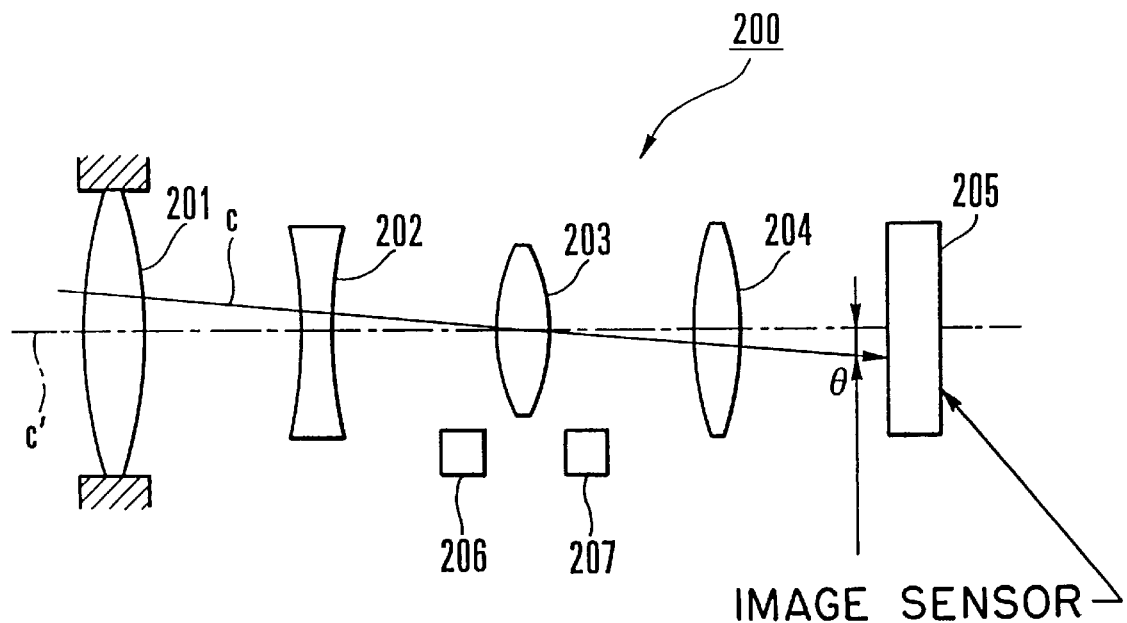
FIGS. 19(a) and 19(b) are diagrams for explaining the driving state of a shift lens occurring when an optical axis has deviated from the center of the image pickup optical system.
Figure 19B:
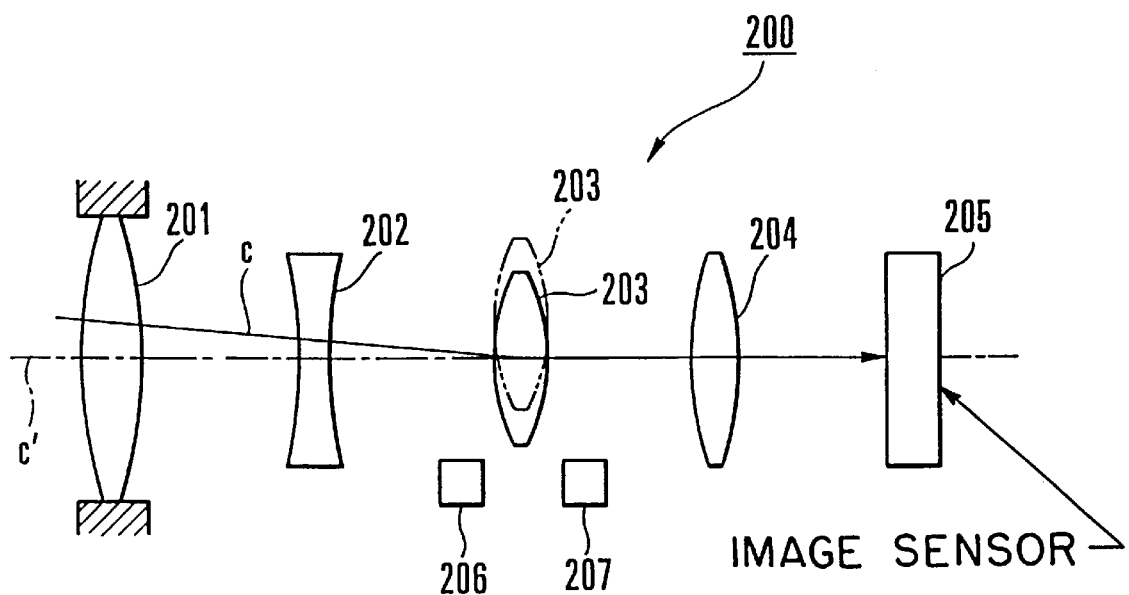

When the power supply switch 133 is turned off at a point of time t1 (FIG. 17(a)), the mode microcomputer 132 notifies the main microcomputer 134 and the driving amount control part 131 of the turning-off of the power supply switch 133 at a point of time t2 (FIG. 17(b)).

Then, in a case where the recorder 141 is in the process of recording a video signal on a magnetic tape, the main microcomputer 134 detects the stoppage of the recording mode at a point of time t4 at which a predetermined period of time T required for the completion of the stopping operation has elapsed (FIG. 17(c)). At the same time, the connection of the changeover switch 156 of the driving amount control part 131 is changed over to the side of the predetermined-value output circuit 155, and the control operation of the driving amount of the shift lens 7 at the time of turning-off of the power supply is performed (FIG. 17(d)). Then, at a point of time t5 at which the lens holding frame 13 holding the shift lens 7 has come into contact with the inner wall of the lens barrel 2 to terminate the control operation of the driving amount of the shift lens 7, the power-supply off flag FOFF is set to "1" to output an instruction for allowing the turning-off of the power supply (FIG. 17(e)).

On the other hand, in a case where the recorder 141 is not performing the recording operation, for example, when the recorder 141 is not loaded with any magnetic tape, it is not necessary to wait for the predetermined period of time T, because the predetermined period of time T is a waiting time required for ending the recording operation of the recorder 141 on the magnetic tape at the time of turning-off of the power supply. Accordingly, in this case, at the same time that the mode microcomputer 132 notifies the main microcomputer 134 and the driving amount control part 131 of the turning-off of the power supply switch 133 at the point of time t2 (FIG. 17(b)), the main microcomputer 134 detects the stoppage of the recording mode, as indicated by a broken line in FIG. 17(c), and starts the control operation of the movement of the shift lens 7 at the point of time t2, as indicated by a broken line in FIG. 17(d). Then, at a point of time t3 at which the lens holding frame 13 has come into contact with the inner wall of the lens barrel 2 to end the control operation of the movement of the shift lens 7, the power-supply off flag FOFF is set to "1" to output an instruction for allowing the turning-off of the power supply, as indicated by a broken line in FIG. 17(e).

As described above, the main microcomputer 134 always watches the recorder 141, and, if the recorder 141 is not in the process of the recording operation when the mode microcomputer 132 has detected the request for turning-off of the power supply, the control operation of the movement of the shift lens 7 can be started earlier. Accordingly, the time for turning off the power supply can be made earlier, so that the effect of electric power saving can be obtained.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while in the above-described embodiments an image-shake preventing lens is made to gradually come into contact with a movable-range end by controlling the position of the image-shake preventing lens when an image-shake preventing operation is ended, the image-shake preventing lens may be made to gradually come into contact with the movable-range end by gradually removing a driving force for floating the image-shake preventing lens.

Further, a movable unit for image-shake prevention according to the invention is not limited to a lens, and may be another movable unit for image-shake prevention, such as an image pickup part.

Further, the software arrangement and the hardware arrangement in each of the embodiments may be adaptively replaced with each other.

Further, in the invention, the embodiments described above or the technical elements thereof may be combined with each other according to necessity.

Further, the invention also applies to cases where each claim or the whole or a part of the arrangement of each of the embodiments constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses and other types of apparatuses, and, moreover, to apparatuses adapted for the cameras, the image pickup apparatuses, optical apparatuses and the other types of apparatuses, and elements constituting the above-mentioned apparatuses.

What is claimed is:

1. An apparatus comprising:
   (A) an image-shake preventing unit;
   (B) a holding unit which movably holds said image-shake preventing unit; and
   (C) a control device which causes said image-shake preventing unit to gradually come into contact with a movable-range end when an image-shake preventing operation is ended.

2. An apparatus according to claim 1, wherein said image-shake preventing unit includes a lens.

3. An apparatus according to claim 1, wherein said holding unit includes a lefts barrel.

4. An apparatus according to claim 1, wherein said movable-range en d includes an inner wall of a lens barrel.

5. An apparatus according to claim 1, further comprising:
a driving device which moves said image-shake preventing unit so as to prevent an image shake, said control device controlling said driving device to cause said image-shake preventing unit to gradually come into contact with said movable-range end when the image-shake preventing operation is ended.

6. An apparatus according to claim 1, further comprising:
a driving device which floats said image-shake preventing unit so as to prevent an image shake, said control device controlling said driving device to cause said image-shake preventing unit to gradually come into contact with said movable-range end when the image-shake preventing operation is ended.

7. An apparatus according to claim 1, wherein, in causing said image-shake preventing unit to gradually come into contact with said movable-range end when the image-shake preventing operation is ended, said control device brings a position in a horizontal direction of said image-shake preventing unit to a movable-range center.

8. An apparatus according to claim 1, wherein said control device moves said image-shake preventing unit at a first speed up to a predetermined position toward said movable-range end when the image-shake preventing operation is ended, and, after that, causes said image-shake preventing unit to come into contact with said movable-range end at a second speed which is lower than said first speed.

9. An apparatus according to claim 1, further comprising:
an adjusting device which adjusts a control value of said control device.

10. An apparatus according to claim 1, wherein said control device starts a control operation for causing said image-shake preventing unit to gradually come into contact with said movable-range end, after completion of counting of a predetermined period of time after an instruction for ending the image-shake preventing operation is issued.

11. An apparatus according to claim 1, further comprising:
an image pickup apparatus which picks up an image, said control device not starting a control operation for causing said image-shake preventing unit to gradually come into contact with said movable-range end, until said image pickup device ends an image pickup operation, even if an instruction for ending the image-shake preventing operation is issued.

12. An apparatus according to claim 1, wherein said control device does not start a control operation for causing said image-shake preventing unit to gradually come into contact with said movable-range end, until an image pickup device ends an image pickup operation, even if an instruction for ending the image-shake preventing operation is issued.

13. An apparatus according to claim 1, further comprising:
an image recording apparatus which records an image, said control device not starting a control operation for causing said image-shake preventing unit to gradually come into contact with said movable-range end, until said image recording apparatus ends an image recording operation, even if an instruction for ending the image-shake preventing operation is issued.

14. An apparatus according to claim 1, wherein said control device does not start a control operation for causing said image-shake preventing unit to gradually come into contact with said movable-range end, until an image recording apparatus ends an image recording operation, even if an instruction for ending the image-shake preventing operation is issued.

15. An apparatus according to claim 1, wherein said apparatus includes an image-shake preventing apparatus.

16. An apparatus according to claim 1, wherein said apparatus includes a camera.

17. An apparatus according to claim 1, wherein said apparatus includes an image pickup apparatus.

18. An apparatus according to claim 1, wherein said apparatus includes a lens barrel.

19. A control method for an image-shake preventing apparatus, comprising the step of:
causing an image-shake preventing unit to gradually come into contact with a movable-range end when an image-shake preventing operation is ended.

20. An apparatus comprising:
(A) an image-shake preventing unit;
(B) a holding unit which movably holds said image shake preventing unit; and
(C) a control device which causes said image-shake preventing unit to come into contact with a movable-range end when an image-shake preventing operation is ended, said control device starting an operation for causing said image-shake preventing unit to come into contact with said movable-range end, after completion of counting of a predetermined period of time after an instruction for ending an image pickup operation is issued.

21. An apparatus according to claim 20, wherein said image-shake preventing unit includes a lens.

22. An apparatus according to claim 20, wherein said holding unit includes a lens barrel.

23. An apparatus according to claim 20, wherein said movable-range end includes an inner wall of a lens barrel.

24. An apparatus according to claim 20, wherein said apparatus includes an image-shake preventing apparatus.

25. An apparatus according to claim 20, wherein said apparatus includes a camera.

26. An apparatus according to claim 20, wherein said apparatus includes an image pickup apparatus.

27. An apparatus according to claim 20, wherein said apparatus includes a lens barrel.

28. A control method for an image-shake preventing apparatus, comprising the step of:
causing an image-shake preventing unit to come into contact with a movable-range end when an image-shake preventing operation is ended, and starting an operation for causing said image-shake preventing unit to come into contact with said movable-range end, after completion of counting of a predetermined period of time after an instruction for ending an image pickup operation is issued.

29. An apparatus comprising:
(A) an image-shake preventing unit;
(B) a holding unit which movably holds said image-shake preventing unit; and
(C) a control device which causes said image-shake preventing unit to come into contact with a movable-range end when an image-shake preventing operation is ended, said control device not starting an operation for causing said image-shake preventing unit to come into contact with said movable-range end, until an image pickup device ends an image pickup operation, even if an instruction for ending an image pickup operation is issued.

30. An apparatus according to claim 29, wherein said image-shake preventing unit includes a lens.

31. An apparatus according to claim 29, wherein said holding unit includes a lens barrel.

32. An apparatus according to claim 29, wherein said movable-range end includes an inner wall of a lens barrel.

33. An apparatus according to claim 29, wherein said apparatus includes an image-shake preventing apparatus.

34. An apparatus according to claim 29, wherein said apparatus includes a camera.

35. An apparatus according to claim 29, wherein said apparatus includes an image pickup apparatus.

36. An apparatus according to claim 29, wherein said apparatus includes a lens barrel.

37. A control method for an image-shake preventing apparatus, comprising the step of:

causing an image-shake preventing unit to come into contact with a movable-range end when an image-shake preventing operation is ended, and not starting an operation for causing said image-shake preventing unit to come into contact with said movable-range end, until an image pickup device ends an image pickup operation, even if an instruction for ending the image pickup operation is issued.

38. An apparatus comprising:

(A) an image-shake preventing unit;

(B) a holding unit which movably holds said image-shake preventing unit; and (C) a control device which causes said image-shake preventing unit to come into contact with a movable-range end when an image-shake preventing operation is ended, said control device not starting an operation for causing said image-shake preventing unit to come into contact with said movable-range end, until an image recording device ends an image recording operation, even if an instruction for ending the image recording operation is issued.

39. An apparatus according to claim 38, wherein said image-shake preventing unit includes a lens.

40. An apparatus according to claim 38, wherein said holding unit includes a lens barrel.

41. An apparatus according to claim 38, wherein said movable-range end includes an inner wall of a lens barrel.

42. An apparatus according to claim 38, wherein said apparatus includes an image-shake preventing apparatus.

43. An apparatus according to claim 38, wherein said apparatus includes a camera.

44. An apparatus according to claim 38, wherein said apparatus includes an image pickup apparatus.

45. An apparatus according to claim 38, wherein said apparatus includes a lens barrel.

46. A control method for an image-shake preventing apparatus, comprising the step of:

causing an image-shake preventing unit to come into contact with a movable-range end when an image-shake preventing operation is ended, and not starting an operation for causing said image-shake preventing unit to come into contact with said movable-range end, until an image recording device ends an image recording operation, even if an instruction for ending the image recording operation is issued.

* * * * *

UNITED STATES PATENT AND TRADEMARK OFFICE
CERTIFICATE OF CORRECTION

PATENT NO. : 6,263,162 B1  
DATED : July 17, 2001  
INVENTOR(S) : Tatsuya Yamazaki et al.

It is certified that error appears in the above-identified patent and that said Letters Patent is hereby corrected as shown below:

Column 1,  
Line 52, delete "angle e" and insert -- angle $\theta$ --.

Column 2,  
Line 28, delete "angle e" and insert -- angle $\theta$ --.

Column 6,  
Line 24, delete "stuck thereto" and insert -- adhered thereto --.

Column 8,  
Line 29, delete "for communion" and insert -- for communication --.  
Line 46, delete "step SB" and insert -- step S8 --.

Column 10,  
Line 57, delete "amount AD" and insert -- amount $\Delta$D --.

Column 17,  
Line 58, delete "amount AR" and insert -- amount $\Delta$R --.

Column 21,  
Line 8, delete "en d" and insert -- end --.

Signed and Sealed this

Twenty-first Day of May, 2002

Attest:

*Attesting Officer*

JAMES E. ROGAN  
*Director of the United States Patent and Trademark Office*